United States Patent
Arnold

(10) Patent No.: US 6,654,015 B1
(45) Date of Patent: Nov. 25, 2003

(54) METHOD AND APPARATUS FOR GENERATING A GEOMETRIC SKELETON OF A POLYGONAL SHAPE

(75) Inventor: Michael Richard Arnold, Surry Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/410,736

(22) Filed: Oct. 1, 1999

(30) Foreign Application Priority Data

Oct. 2, 1998 (AU) .............................................. PP6317

(51) Int. Cl.[7] .............................................. G06T 11/00
(52) U.S. Cl. ...................................................... 345/441
(58) Field of Search ................................ 345/441–443, 345/619; 382/276–308

(56) References Cited

U.S. PATENT DOCUMENTS 6,317,859 B1 * 11/2001 Papadopoulou ................. 716/4

OTHER PUBLICATIONS

Kenneth R. Castleman, Digital Image Processing, 1996, Prentice–Hall, Inc., p. 474–475.*

F. Heitz et al., "Multiscale Minimization of Global Energy Functions in Some Visual Recovery Problems", CVGIP: Image Understanding, Jan. 1994, vol. 59, pp. 125–134.

* cited by examiner

*Primary Examiner*—Jeffery Brier
*Assistant Examiner*—G. F. Cunningham
(74) *Attorney, Agent, or Firm*—Fitzpatrick, Cella, Harper & Scinto

(57) ABSTRACT

The method generates a skeleton of a polygon by selecting a line segment or concave vertex (104) of the polygon and comparing it against the other line segments(106) in turn. The method determines (108,110,112), when comparing a selected line segment or concave vertex i with another line segment j, any significant parameter value associated with a point on selected line segment, where the locus(i,j) at that parameter value describes the skeleton.

35 Claims, 23 Drawing Sheets

METHOD AND APPARATUS FOR GENERATING A GEOMETRIC SKELETON OF A POLYGONAL SHAPE

The file of this patent application includes a CD-ROM with a file named APPENDIX A.TXT, created Dec. 17, 2002, and having a size of 28,012 bytes, which is incorporated by reference. This file contains computer program listings referred to as Appendices A. Appendix A is a software program embodying aspects of the present invention. These programs were written for Microsoft Windows. Appendix A is a program that describes the geometric skeleton of a polygonal shape with respect to one of its sides according to the present invention.

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

FIELD OF INVENTION

The present invention relates to polygons in general and in particular to the generation of geometric skeletons of polygonal shapes, such as character font outlines and shapes.

BACKGROUND OF INVENTION

The generation of a geometric skeleton is an important step in many image-processing tasks such as offset generation, character stroke generation, and artistic effects. For example, in character stroke generation, the geometric skeleton provides a medial axis transform associating points on the boundary with corresponding points on the other side of the stroke.

The publication "Medial Axis Transformation of a Planar Shape", IEEE Transactions on Pattern Analysis and Machine Intelligence, Vol. PAM1–4, No. 4, July 1982, by D. T. Lee (hereinafter called Lee) discloses a method for computing a medial axis of a planar shape represented by an n-edge polygon. Lee defines the transformation as follows: given an object represented, say by a simple polygon G, the medial axis is the set of points {q} internal to G such that there are least two points on the object's boundary that are equidistant from {q} and are closest to {q}. Because of its shape, the medial axis of a figure is also called the skeleton or the symmetric axis of the figure. Specifically, Lee defines the skeleton $S_p$ for a polygonal shape P as a set of edges and nodes, where the edges are of the form of loci, and the nodes are the intersections points of these loci (locations in Sp that are closest to more than two points in P). The skeleton of a polygon is described in Lee as being made up of three types of loci. Namely, (1) the locus between two line segments, which is in this case a line segment, (2) the locus between a point and a line segment, which is in this case a parabolic segment, (3) the locus between two points, which is in this case a line. This method suffers from errors in calculating the skeleton, due to errors in floating point calculations, especially in calculating (2) above. Consequently, it is not possible to accurately describe a geometric skeleton in this fashion.

SUMMARY OF THE INVENTION

It is an object of the present invention to ameliorate one or more disadvantages of the prior art.

According to one aspect of the invention, there is provided a method of generating a component of a geometric skeleton of a polygon, said polygon comprising a plurality of interconnected line segments, the method comprising the step of: determining, for a current line segment of said plurality, a first point on a line perpendicular to said current line segment at a second point corresponding to a parameter value, wherein said first point is a point of a locus between said current line segment and one other of said line segments, which locus point is the closest locus point, on said line, to the current line segment of any locus point of said current line segment and any one of the line segments other than the current line segment, said first point forming a point of said component of said skeleton.

According to another aspect of the invention, there is provided a method of generating components of a geometric skeleton of a polygon, wherein said polygon comprises a plurality of line segments and one or more concave vertices, the method comprising the step of: determining, for each said concave vertex, a first point on a radial line from the current concave vertex, wherein said radial line has a corresponding parameter value and said first point is a point of a locus between said current concave vertex and a said line segment, which locus point is the closest locus point on said radial line of any locus point of said current concave vertex and any one of said line segments, said first point forming a point of said components of said skeleton.

According to still another aspect of the invention, there is provided a method of generating a geometric skeleton of a polygonal shape, the method comprising the steps of: determining a parameter value of an edge or concave vertex of the polygonal shape where the distance from said edge or concave vertex to a point of a locus between said edge or concave vertex and another edge of the polygonal shape is a minimum; and storing said parameter value and a label representative of said another edge having said minimum distance as a data signal representative of the geometric skeleton at said parameter value.

According to still another aspect of the invention, there is provided a method of generating a representation of components of a geometric skeleton of a polygon, wherein the polygon comprises a plurality of line segments, the method comprising the steps of: generating, for each said line segment (i) of the polygon, a list comprising a plurality of members { . . . ,(t',N), . . . ,(t",P), . . . }, where (t',N) and (t",P) are any members of the list, t' and t" are parameter values of a current line segment (i) and which are adjacent parameter values in the list, and N and P are said line segments of the polygon other than the current line segment (i), whereby a point of locus(i,N) on a line perpendicular to the current line segment (i) at the parameter value t' forms one point of the skeleton and a point of locus(i,P) on a line perpendicular to the current line segment (i) at the parameter value t" forms another point of the skeleton, and for any parameter value t'" immediate t' and t" a point, being one of a point of locus (i,N) or a point of locus(i,P) on the line perpendicular to the current line segment (i) at the parameter value t'", which is closest to the current line segment (i) forms another point of the skeleton; and storing said lists as a representation of said components of said skeleton.

According to still another aspect of the invention, there is provided a method of generating a representation of components of a geometric skeleton of a polygon, wherein the polygon comprises a plurality of line segments and one or more concave vertices, the method comprising the steps of: generating, for each concave vertex (i) of the polygon, a list comprising a plurality of members { . . . ,(θ',N), . . . , (θ",P), ... }, where (θ',N) and (θ",P) are any members of the list, θ' and θ" are parameter values of a current concave vertex (i) and which are adjacent parameter values in the list, and N and P are said line segments of the polygon, whereby a point of locus(i,N) on a radial line from the current concave vertex (i) at the parameter value θ' forms one point of the skeleton and a point of locus(i,P) on a radial line from the current concave vertex (i) at the parameter value θ" forms another point of the skeleton, and for any parameter value θ'" immediate θ' and θ" a point, being one of a point of locus (i,N) or a point of locus(i,P) on the radial line from the current concave vertex (i) at the parameter value θ'", which is closest to the current concave vertex (i) forms another point of the skeleton; and storing said lists as a representation of said components of said skeleton.

According to still another aspect of the invention, there is provided a method of generating a representation of a geometric skeleton of a polygon, wherein the polygon comprises a plurality of line segments, the method comprising the steps of: generating, for each said line segment (i) of the polygon, a list comprising a plurality of members { ...,(t', N), ...,(t",P), ... }, where (t',N) and (t",P) are any members of the list, t' and t" are parameter values of a current line segment (i) and which are adjacent parameter values in the list, and N and P are said line segments of the polygon other than the current line segment (i), whereby a point of locus(i,N) on a line perpendicular to the current line segment (i) at the parameter value t' forms one point of the skeleton and a point of locus(i,P) on a line perpendicular to the current line segment (i) at the parameter value t" forms another point of the skeleton, and for any parameter value t'" immediate t' and t" a point, being one of a point of locus (i,N) or a point of locus(i,P) on the line perpendicular to the current line segment (i) at the parameter value t'", which is closest to the current line segment (i) forms another point of the skeleton; generating, for each concave vertex (i) of the polygon if any, a list comprising a plurality of members { ...,(θ',N), ..., (θ",P), ... }, where (θ',N) and (θ",P) are any members of the list, θ' and θ" are parameter values of a current concave vertex (i) and which are adjacent parameter values in the list, and N and P are said line segments of the polygon, whereby a point of locus(i,N) on a radial line from the current concave vertex (i) at the parameter value θ' forms one point of the skeleton and a point of locus(i,P) on a radial line from the current concave vertex (i) at the parameter value θ" forms another point of the skeleton, and for any parameter value θ'" immediate θ' and θ" a point, being one of a point of locus (i,N) or a point of locus(i,P) on the radial line from the current concave vertex (i) at the parameter value θ'", which is closest to the current concave vertex (i) forms another point of the skeleton; and storing said lists as a representation of said skeleton.

According to still another aspect of the invention, there is provided a method of generating a representation of skeletal components of a polygon, the method comprising the steps of: (a) selecting a first edge $N_i$ of the polygon; (b) creating a list associated with said first edge for storing k members $(t_k,N_k)$, where $t_k$ is a parameter value associated with a point on said first edge, and $N_k$ is an edge of the polygon; (c) selecting a second edge $N_j$ of the polygon other than the first edge $N_i$; (d) determining at least one said parameter value on said first edge $N_i$ so that a locus($N_i,N_j$) distance function is monotonic moving away from said at least one parameter value; (e) adding said determined parameter value to said list if not already on said list; (f) determining, for each two members of the list $(t_k,N_k)$, $(t_{k+1}, N_{k+1})$ having adjacent parameter values, if a point of locus($N_i,N_j$) is closer to the first edge than either of a point of locus($N_i,N_k$) and a point of locus($N_i,N_{k+1}$) at any parameter value intermediate $t_k$ and $t_{k+1}$; (g) adding said determined intermediate parameter value to said list, if not already on said list; (h) replacing any existing member $(t_k,N_k)$ of the list with the member $(t_k,N_j)$ if the locus ($N_i$, $N_j$) distance function is less than the locus ($N_i,N_k$) distance function at the parameter value $t_k$; (i) repeating steps (c) to (h) for each remaining said second edge; (j) repeating steps (a) to (i) for each remaining said first edge; and (k) storing said lists as a data signal representative of said skeletal components.

According to still another aspect of the invention, there is provided a method of generating a representation of skeletal components of a polygon, the method comprising the steps of: (a) selecting a first concave vertex $V_i$ of the polygon; (b) creating a list associated with said first concave vertex for storing k members $(t_k,N_k)$, where $t_k$ is a parameter value associated with a radial line from said first concave vertex, and $N_k$ is an edge of the polygon; (c) selecting a second edge $N_j$ of the polygon; (d) determining at least one said parameter value associated with said first concave vertex $V_i$ so that a locus($V_i,N_j$) distance function is monotonic moving away from said at least one parameter value; (e) adding said determined parameter value to said list if not already on said list; (f) determining, for each two members of the list $(t_k,N_k)$, $(t_{k+1}, N_{k+1})$ having adjacent parameter values, if a point of locus($V_i,N_j$) is closer to the first concave vertex than either of a point of locus($V_i,N_k$) and a point of locus($V_i,N_{k+1}$) at any parameter value intermediate $t_k$ and $t_{k+1}$; (g) adding said determined intermediate parameter value to said list, if not already on said list; (h) replacing any existing member $(t_k,N_k)$ of the list with the member $(t_k,N_j)$ if the locus ($V_i,N_j$) distance function is less than the locus ($V_i$, $N_k$) distance function at the parameter value $t_k$; (i) repeating steps (c) to (h) for each remaining said second edge; (j) repeating steps (a) to (i) for each remaining said first concave vertices; and (k) storing said lists as a data signal representative of said skeletal components.

According to still another aspect of the invention, there is provided apparatus for generating a component of a geometric skeleton of a polygon, said polygon comprising a plurality of interconnected line segments, the apparatus comprising: means for determining, for a current line segment of said purality, a first point on a line perpendicular to said current line segment at a second point corresponding to a parameter value, wherein said first point is a point of a locus between said current line segment and one other of said line segments, which locus point is the closest locus point, on said line, to the current line segment of any locus point of said current line segment and any one of the line segments other than the current line segment, said first point forming a point of said component of said skeleton.

According to still another aspect of the invention, there is provided apparatus for generating components of a geometric skeleton of a polygon, wherein said polygon comprises a plurality of line segments and one or more concave vertices, the apparatus comprising: means for determining, for each said concave vertex, a first point on a radial line from the current concave vertex, wherein said radial line has a corresponding parameter value and said first point is a point of a locus between said current concave vertex and a said line segment, which locus point is the closest locus point on said radial line of any locus point of said current concave vertex and any one of said line segments, said first point forming a point of said components of said skeleton.

According to still another aspect of the invention, there is provided apparatus for generating a representation of components of a geometric skeleton of a polygon, wherein the polygon comprises a plurality of line segments, the apparatus comprising: means for generating, for each said line segment (i) of the polygon, a list comprising a plurality of members { ...,(t',N),...,(t",P),... }, where (t',N) and (t",P) are any members of the list, t' and t" are parameter values of a current line segment (i) and which are adjacent parameter values in the list, and N and P are said line segments of the polygon other than the current line segment (i), whereby a point of locus(i,N) on a line perpendicular to the current line segment (i) at the parameter value t' forms one point of the skeleton and a point of locus(i,P) on a line perpendicular to the current line segment (i) at the parameter value t" forms another point of the skeleton, and for any parameter value t'" immediate t' and t" a point, being one of a point of locus (i,N) or a point of locus(i,P) on the line perpendicular to the current line segment (i) at the parameter value t'", which is closest to the current line segment (i) forms another point of the skeleton; and means for storing said lists as a representation of said components of said skeleton.

According to still another aspect of the invention, there is provided apparatus for generating a representation of components of a geometric skeleton of a polygon, wherein the polygon comprises a plurality of line segments and one or more concave vertices, the apparatus comprising: means for generating, for each concave vertex (i) of the polygon, a list comprising a plurality of members { ...,(θ',N), ..., (θ",P), ... }, where (θ',N) and (θ",P) are any members of the list, θ' and θ" are parameter values of a current concave vertex (i) and which are adjacent parameter values in the list, and N and P are said line segments of the polygon, whereby a point of locus(i,N) on a radial line from the current concave vertex (i) at the parameter value θ' forms one point of the skeleton and a point of locus(i,P) on a radial line from the current concave vertex (i) at the parameter value θ" forms another point of the skeleton, and for any parameter value θ'" immediate θ' and θ" a point, being one of a point of locus (i,N) or a point of locus(i,P) on the radial line from the current concave vertex (i) at the parameter value θ'", which is closest to the current concave vertex (i) forms another point of the skeleton; and means for storing said lists as a representation of said components of said skeleton.

According to still another aspect of the invention, there is provided apparatus for generating a representation of a geometric skeleton of a polygon, wherein the polygon comprises a plurality of line segments, the apparatus comprising: means for generating, for each said line segment (i) of the polygon, a list comprising a plurality of members { ...,(t',N),...,(t",P),... }, where (t',N) and (t",P) are any members of the list, t' and t" are parameter values of a current line segment (i) and which are adjacent parameter values in the list, and N and P are said line segments of the polygon other than the current line segment (i), whereby a point of locus(i,N) on a line perpendicular to the current line segment (i) at the parameter value t' forms one point of the skeleton and a point of locus(i,P) on a line perpendicular to the current line segment (i) at the parameter value t" forms another point of the skeleton, and for any parameter value t'" immediate t' and t" a point, being one of a point of locus (i,N) or a point of locus(i,P) on the line perpendicular to the current line segment (i) at the parameter value t'", which is closest to the current line segment (i) forms another point of the skeleton; means for generating, for each concave vertex (i) of the polygon if any, a list comprising a plurality of members { ...,(θ', N), ...,(θ",P), ... }, where (θ',N) and (θ",P) are any members of the list, θ' and θ" are parameter values of a current concave vertex (i) and which are adjacent parameter values in the list, and N and P are said line segments of the polygon, whereby a point of locus(i,N) on a radial line from the current concave vertex (i) at the parameter value θ' forms one point of the skeleton and a point of locus(i,P) on a radial line from the current concave vertex (i) at the parameter value θ" forms another point of the skeleton, and for any parameter value θ'" immediate θ' and θ" a point, being one of a point of locus (i,N) or a point of locus(i,P) on the radial line from the current concave vertex (i) at the parameter value θ'", which is closest to the current concave vertex (i) forms another point of the skeleton; and means for storing said lists as a representation of said skeleton.

According to still another aspect of the invention, there is provided apparatus for generating a representation of skeletal components of a polygon, the apparatus comprising: first selection means for selecting a first edge $N_i$ of the polygon; creation means for creating a list associated with said first edge for storing k members $(t_k,N_k)$, where $t_k$ is a parameter value associated with a point on said first edge, and $N_k$ is an edge of the polygon; second selection means for selecting a second edge $N_j$ of the polygon other than the first edge $N_i$; first determination means for determining at least one said parameter value on said first edge $N_i$ so that a locus($N_i,N_j$) distance function is monotonic moving away from said at least one parameter value; first addition means for adding said determined parameter value to said list if not already on said list; second determination means for determining, for each two members of the list $(t_k,N_k)$, $(t_{k+1}, N_{k+1})$ having adjacent parameter values, if a point of locus $(N_i,N_j)$ is closer to the first edge than either of a point of locus($N_i,N_k$) and a point of locus($N_i,N_{k+1}$) at any parameter value intermediate $t_k$ and $t_{k+1}$; second addition means for adding said determined intermediate parameter value to said list, if not already on said list; replacement means for replacing any existing member $(t_k,N_k)$ of the list with the member $(t_k,N_j)$ if the locus $(N_i, N_j)$ distance function is less than the locus $(N_i,N_k)$ distance function at the parameter value $t_k$; first repetition means for repeating the operations of the second selection means, first determining means, first addition means, second determination means, second addition means, and replacement means for each remaining said second edge; second repetition means for repeating the operations of the first selection means, creation means, second selection means, first determination means, first addition means, second determination means, second addition means, replacement means, and first repetition means for each remaining said first edge; and storage means for storing said lists as a data signal representative of said skeletal components.

According to still another aspect of the invention, there is provided apparatus for generating a representation of skeletal components of a polygon, the apparatus comprising: first selection means for selecting a first concave vertex $V_i$ of the polygon; creation means for creating a list associated with said first concave vertex for storing k members $(t_k,N_k)$, where $t_k$ is a parameter value associated with a radial line from said first concave vertex, and $N_k$ is an edge of the polygon; second selection means for selecting a second edge $N_j$ of the polygon; first determination means for determining at least one said parameter value associated with said first concave vertex $V_i$ so that a locus($V_i,N_j$) distance function is monotonic moving away from said at least one parameter value; first addition means for adding said determined parameter value to said list if not already on said list; second determination means for determining, for each two members of the list $(t_k,N_k)$, $(t_{k+1}, N_{k+1}$ having adjacent parameter values, if a point of locus($V_i,N_j$) is closer to the first concave vertex than either of a point of locus($V_i,N_k$) and a point of locus($V_i,N_{k+1}$) at any parameter value intermediate $t_k$ and $t_{k+1}$; second addition means for adding said determined intermediate parameter value to said list, if not already on said list; replacement means for replacing any existing member ($t_k,N_k$) of the list with the member ($t_k,N_j$) if the locus ($V_i,N_j$) distance function is less than the locus ($V_i,N_k$) distance function at the parameter value $t_k$; first repetition means for repeating the operations of the second selection means, first determining means, first addition means, second determination means, second addition means, and replacement means for each remaining said second edge; second repetition means for repeating the operations of the first selection means, creation means, second selection means, first determination means, first addition means, second determination means, second addition means, replacement means, and first repetition means for each remaining said first concave vertices; and storage means for storing said lists as a data signal representative of said skeletal components.

According to still another aspect of the invention, there is provided a computer program product having a computer readable medium comprising a computer program for generating a component of a geometric skeleton of a polygon, said polygon comprising a plurality of interconnected line segments, the apparatus comprising: means for determining, for a current line segment of said purality, a first point on a line perpendicular to said current line segment at a second point corresponding to a parameter value, wherein said first point is a point of a locus between said current line segment and one other of said line segments, which locus point is the closest locus point, on said line, to the current line segment of any locus point of said current line segment and any one of the line segments other than the current line segment, said first point forming a point of said component of said skeleton.

According to still another aspect of the invention, there is provided a computer program product having a computer readable medium comprising a computer program for generating components of a geometric skeleton of a polygon, wherein said polygon comprises a plurality of line segments and one or more concave vertices, the computer program product comprising: means for determining, for each said concave vertex, a first point on a radial line from the current concave vertex, wherein said radial line has a corresponding parameter value and said first point is a point of a locus between said current concave vertex and a said line segment, which locus point is the closest locus point on said radial line of any locus point of said current concave vertex and any one of said line segments, said first point forming a point of said components of said skeleton.

According to still another aspect of the invention, there is provided a computer program product having a computer readable medium comprising a computer program for generating a representation of components of a geometric skeleton of a polygon, wherein the polygon comprises a plurality of line segments, the computer program product comprising: means for generating, for each said line segment (i) of the polygon, a list comprising a plurality of members { . . . ,(t',N), . . . ,(t",P), . . . }, where (t',N) and (t",P) are any members of the list, t' and t" are parameter values of a current line segment (i) and which are adjacent parameter values in the list, and N and P are said line segments of the polygon other than the current line segment (i), whereby a point of locus(i,N) on a line perpendicular to the current line segment (i) at the parameter value t' forms one point of the skeleton and a point of locus(i,P) on a line perpendicular to the current line segment (i) at the parameter value t" forms another point of the skeleton, and for any parameter value t''' immediate t' and t" a point, being one of a point of locus (i,N) or a point of locus(i,P) on the line perpendicular to the current line segment (i) at the parameter value t''', which is closest to the current line segment (i) forms another point of the skeleton; and means for storing said lists as a representation of said components of said skeleton.

According to still another aspect of the invention, there is provided a computer program product having a computer readable medium comprising a computer program for generating a representation of components of a geometric skeleton of a polygon, wherein the polygon comprises a plurality of line segments and one or more concave vertices, the computer program product comprising: means for generating, for each concave vertex (i) of the polygon, a list comprising a plurality of members { . . . ,(θ',N), . . . , (θ",P), . . . }, where (θ',N) and (θ",P) are any members of the list, θ' and θ" are parameter values of a current concave vertex (i) and which are adjacent parameter values in the list, and N and P are said line segments of the polygon, whereby a point of locus(i,N) on a radial line from the current concave vertex (i) at the parameter value θ' forms one point of the skeleton and a point of locus(i,P) on a radial line from the current concave vertex (i) at the parameter value θ" forms another point of the skeleton, and for any parameter value θ''' immediate θ' and θ" a point, being one of a point of locus (i,N) or a point of locus(i,P) on the radial line from the current concave vertex (i) at the parameter value θ''', which is closest to the current concave vertex (i) forms another point of the skeleton; and means for storing said lists as a representation of said components of said skeleton.

According to still another aspect of the invention, there is provided a computer program product having a computer readable medium comprising a computer program for generating a representation of a geometric skeleton of a polygon, wherein the polygon comprises a plurality of line segments, the computer program product comprising: means for generating, for each said line segment (i) of the polygon, a list comprising a plurality of members { . . . , (t',N), . . . ,(t',P), . . . }, where (t',N) and (t",P) are any members of the list, t' and t" are parameter values of a current line segment (i) and which are adjacent parameter values in the list, and N and P are said line segments of the polygon other than the current line segment (i), whereby a point of locus(i,N) on a line perpendicular to the current line segment (i) at the parameter value t' forms one point of the skeleton and a point of locus(i,P) on a line perpendicular to the current line segment (i) at the parameter value t" forms another point of the skeleton, and for any parameter value t''' immediate t' and t" a point, being one of a point of locus (i,N) or a point of locus(i,P) on the line perpendicular to the current line segment (i) at the parameter value t''', which is closest to the current line segment (i) forms another point of the skeleton; means for generating, for each concave vertex (i) of the polygon if any, a list comprising a plurality of members { . . . ,(θ',N), . . . ,( θ",P), . . . }, where (θ',N) and (θ",P) are any members of the list, θ' and θ" are parameter values of a current concave vertex (i) and which are adjacent parameter values in the list, and N and P are said line segments of the polygon, whereby a point of locus(i,N) on a radial line from the current concave vertex (i) at the parameter value θ' forms one point of the skeleton and a point of locus(i,P) on a radial line from the current concave vertex (i) at the parameter value θ" forms another point of the skeleton, and for any parameter value θ''' immediate θ' and θ" a point, being one of a point of locus (i,N) or a point of locus(i,P) on the radial line from the current concave vertex (i) at the parameter value θ''', which is closest to the current concave vertex (i) forms another point of the skeleton; and means for storing said lists as a representation of said skeleton.

According to still another aspect of the invention, there is provided a computer program product having a computer readable medium comprising a computer program for generating a representation of skeletal components of a polygon, the computer program product comprising: first selection means for selecting a first edge $N_i$ of the polygon; creation means for creating a list associated with said first edge for storing k members $(t_k, N_k)$, where $t_k$ is a parameter value associated with a point on said first edge, and $N_k$ is an edge of the polygon; second selection means for selecting a second edge $N_j$ of the polygon other than the first edge $N_i$; first determination means for determining at least one said parameter value on said first edge $N_i$ so that a locus$(N_i,N_j)$ distance function is monotonic moving away from said at least one parameter value; first addition means for adding said determined parameter value to said list if not already on said list; second determination means for determining, for each two members of the list $(t_k,N_k)$, $(t_{k+1}, N_{k+1})$ having adjacent parameter values, if a point of locus$(N_i,N_j)$ is closer to the first edge than either of a point of locus$(N_i,N_k)$ and a point of locus$(N_i,N_{k+1})$ at any parameter value intermediate $t_k$ and $t_{k+1}$; second addition means for adding said determined intermediate parameter value to said list, if not already on said list; replacement means for replacing any existing member $(t_k,N_k)$ of the list with the member $(t_k,N_j)$ if the locus $(N_i, N_j)$ distance function is less than the locus $(N_i,N_k)$ distance function at the parameter value $t_k$; first repetition means for repeating the operations of the second selection means, first determining means, first addition means, second determination means, second addition means, and replacement means for each remaining said second edge; second repetition means for repeating the operations of the first selection means, creation means, second selection means, first determination means, first addition means, second determination means, second addition means, replacement means, and first repetition means for each remaining said first edge; and storage means for storing said lists as a data signal representative of said skeletal components.

According to still another aspect of the invention, there is provided a computer program product having a computer readable medium comprising a computer program for generating a representation of skeletal components of a polygon, the computer program product comprising: first selection means for selecting a first concave vertex $V_i$ of the polygon; creation means for creating a list associated with said first concave vertex for storing k members $(t_k,N_k)$, where $t_k$ is a parameter value associated with a radial line from said first concave vertex, and $N_k$ is an edge of the polygon; second selection means for selecting a second edge $N_j$ of the polygon; first determination means for determining at least one said parameter value associated with said first concave vertex $V_i$ so that a locus$(V_i,N_j)$ distance function is monotonic moving away from said at least one parameter value; first addition means for adding said determined parameter value to said list if not already on said list; second determination means for determining, for each two members of the list $(t_k,N_k)$, $(t_{k+1}, N_{k+1})$ having adjacent parameter values, if a point of locus$(V_i,N_j)$ is closer to the first concave vertex than either of a point of locus$(V_i,N_k)$ and a point of locus$(V_i,N_{k+1})$ at any parameter value intermediate $t_k$ and $t_{k+1}$; second addition means for adding said determined intermediate parameter value to said list, if not already on said list; replacement means for replacing any existing member $(t_k,N_k)$ of the list with the member $(t_k,N_j)$ if the locus $(V_i,N_j)$ distance function is less than the locus $(V_i,N_k)$ distance function at the parameter value $t_k$; first repetition means for repeating the operations of the second selection means, first determining means, first addition means, second determination means, second addition means, and replacement means for each remaining said second edge; second repetition means for repeating the operations of the first selection means, creation means, second selection means, first determination means, first addition means, second determination means, second addition means, replacement means, and fist repetition means for each remaining said first concave vertices; and storage means for storing said lists as a data signal representative of said skeletal components.

BRIEF DESCRIPTION OF THE DRAWINGS

Embodiments of the invention are described with reference to the drawings, in which.

DETAILED DESCRIPTION

Figure 1:
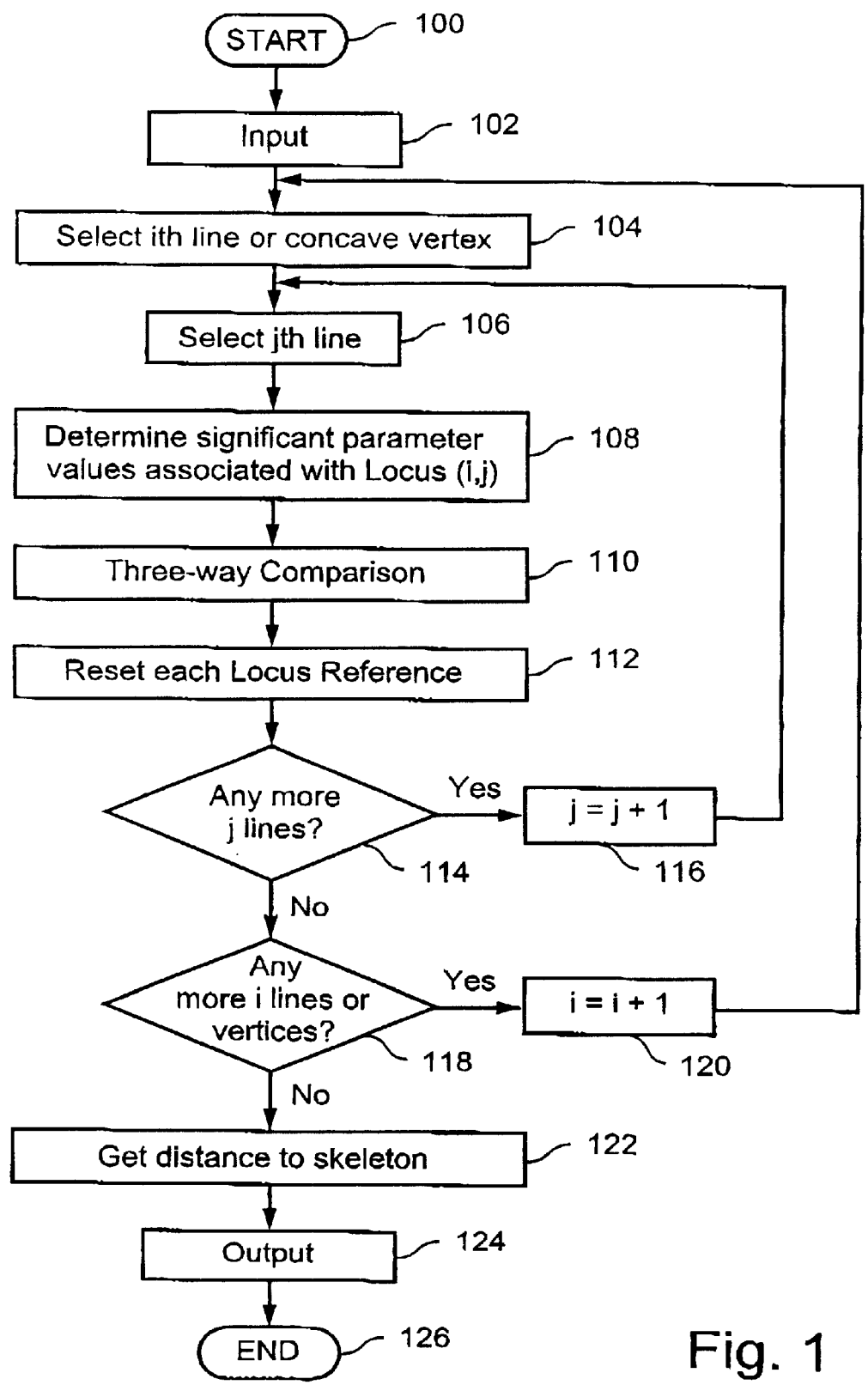
FIG. 1 is a flow diagram of a method for generating a geometric skeleton of a polygonal shape in accordance with a first embodiment.

Where reference is made in any one or more of the accompanying drawings to steps and/or features, which have the same reference numerals, those steps and/or features have for the purposes of this description the same function (s) or operation(s), unless the contrary intention appears.

The principles of the preferred methods described herein have general applicability to generating a geometric skeleton of a polygonal shape. However, for ease of explanation, the steps of the preferred methods are described with reference to generating a skeleton of particular character font outlines and shapes. However, it is not intended that the present invention be limited to a method of generating skeletons of these particular character font outlines and shapes. For example, the invention may have application to generating skeletons for general polygons and shapes. In addition, the invention may have application to other applications such as generating offsets. Whilst the present invention has particular application to two dimensional polygonal shapes, it may have also application to other geometric objects which can be decomposed into objects for which the geometric skeleton is easily defined.

Some portions of the detailed descriptions which follow are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms, such as locus points, are to be associated with the appropriate physical quantities and are merely convenient labels applied to these quantities. Unless specifically stated otherwise in the specification it is apparent that terms such as "selecting", "determining", "generating", "creating", and "storing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A further embodiment relates to apparatus for performing the operations of the preferred methods herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The structure of a conventional general purpose computer will appear from the description below.

In addition, a still further embodiment relates to a computer program product having a computer readable medium including a computer program for performing the operations of the preferred methods herein on the above said apparatus. The computer readable medium is taken herein to include any transmission medium for transmitting the computer program between a source and a designation. The transmission medium may include storage devices such as magnetic or optical disks, memory chips, or other storage devices suitable for interfacing with a general purpose computer. The transmission medium may also include a hard-wired medium such as exemplified in the Internet system, or wireless medium such as exemplified in the GSM mobile telephone system. It will be appreciated that a variety of programming languages and implementations thereof may be used to implement the teachings of the invention as described herein.

Before proceeding with a description of the embodiments, a description of a new skeleton representation as used hereinafter is given. In this approach, the geometric skeleton $S_x^P$ is represented for each line segment and concave vertex, X, of the polygonal shape P with respect to P~X (where "~" represents set subtraction) as follows:

$$S_x^P = \{y | \exists a \in P \sim X, b \in X \text{ such that } d(a,y)=d(b,y) \leq d(p,y) \forall p \in P\} \quad \text{Eqn 1}$$

where $d(p_1, p_1)$ means the distance between points $p_1$ and $p_1$. The total skeleton $S_p$ is then the union of all skeletons $S_x^P$ for all line segments and concave vertices X.

As long as the computer representations of the loci with respect to X are well defined, this approach of describing the skeleton is very robust.

The preferred methods are based on a method for generating a representation of a geometric skeleton of abovementioned type.

Figure 16A:
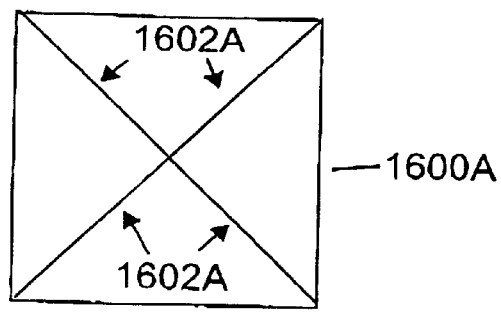
FIG. 16A shows an example of a polygon and a skeleton generated by the method of FIG. 1.
Figure 16B:
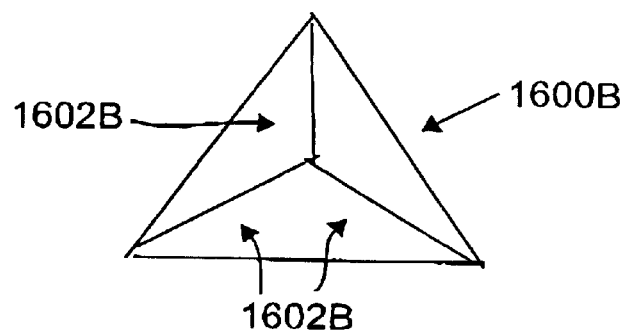
FIG. 16B shows another example of a polygon and a skeleton generated by the method of FIG. 1.
Figure 16C:
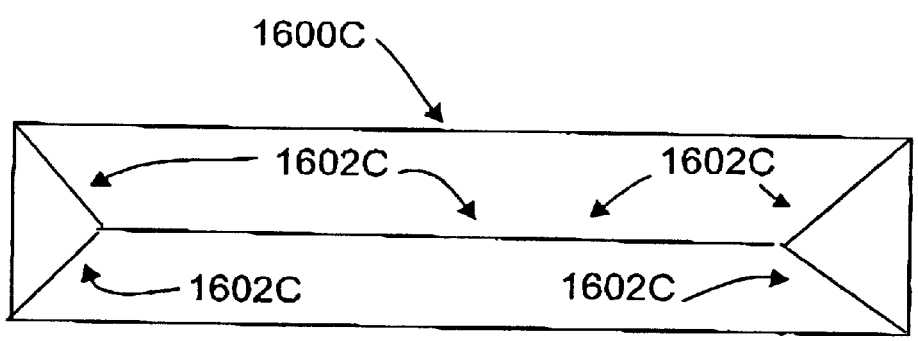
FIG. 16C shows another example of a polygon and a skeleton generated by the method of FIG. 1.
Figure 16D:
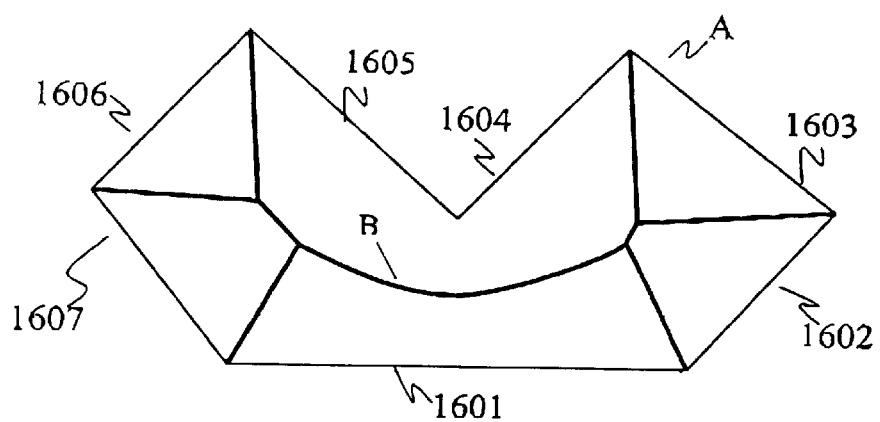
FIG. 16D shows another example of a polygon and a skeleton generated by the method of FIG. 1.

For illustration purposes only, FIGS. 16A, 16B, 16C and 16D show some skeletons of simple polygons in accordance with the above-mentioned skeleton representation. FIG. 16A shows a polygon in the shape of a square 1600A and its corresponding skeleton 1602A. FIG. 16B shows a polygon in the shape of a triangle 1600B and its corresponding skeleton 1602B. FIG. 16C shows a polygon in the shape of a rectangle 1600C and its corresponding skeleton 1602C. FIG. 16D shows a more complex polygon having sides 1601, 1602, 1603, 1604, 1605, 1606, and 1607 and its corresponding skeleton B.

Before proceeding with the description of the embodiments, a brief discussion of the terminlogy used herein is given.

Figure 5:
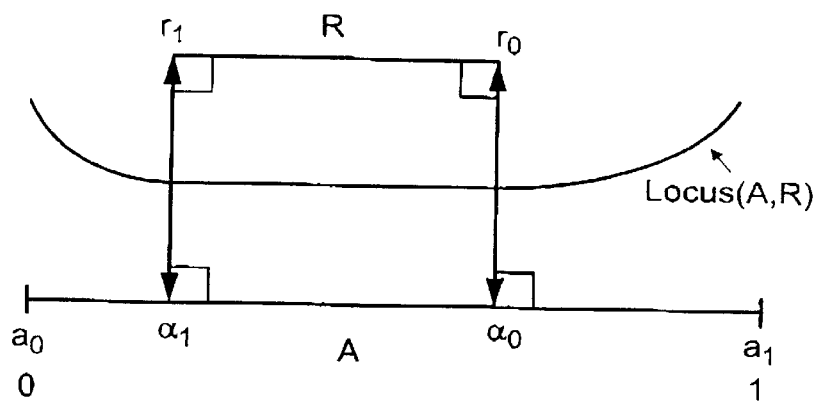
FIG. 5 is an example representation of two parallel line segments.

The term "t-value" refers to a parameter value corresponding to a point on a line segment i, which line segment i is represented by a parametric representation having t-values, with the start of the line segment i having a parameter value (t-value) of zero (0) and the other end of the line segment i having a parameter value (t-value) of one(1). As an illustration, FIG. 5 shows a line segment A which has been parameterized having a zero t-value at endpoint $a_0$ and a t-value of one at endpoint $a_1$.

Figure 11:
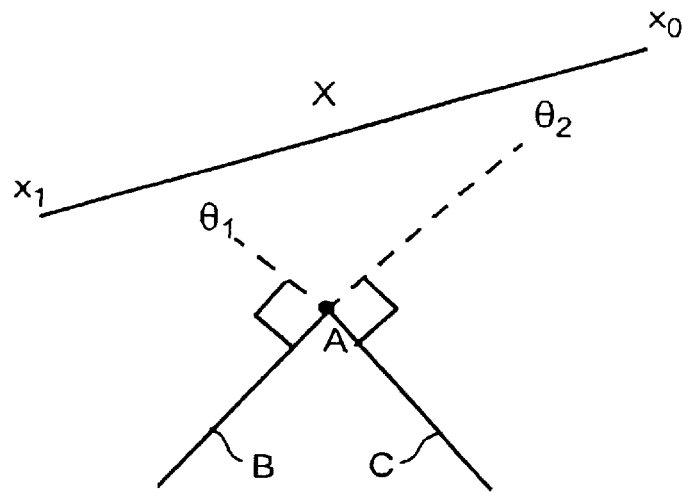
FIG. 11 is an example of a representation of a concave vertex and a line segment.

The term "θ-value" refers to a parameter value corresponding to the angle of a vector extending from a concave vertex i, which concave vertex i is represented by a parametric representation having θ-values with period $2\pi$. As an illustration, FIG. 11 shows an example of a concave vertex A having start and end θ-values of $\theta_1$ and $\theta_1$.

Figure 6:
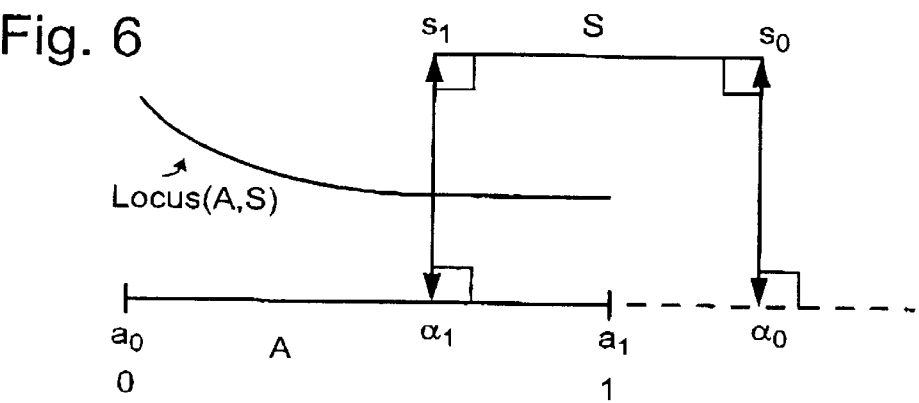
FIG. 6 is another example of a representation of the locus of two parallel line segments.
Figure 8A:
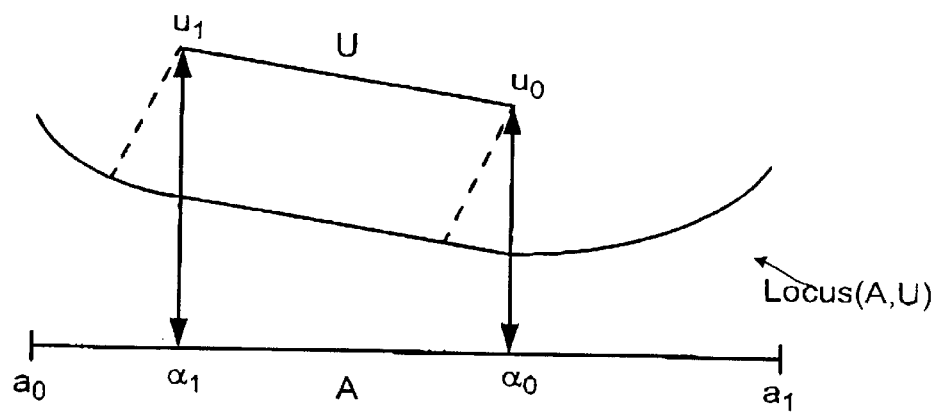
FIG. 8A is another example of a representation of the locus of two line segments.
Figure 9:
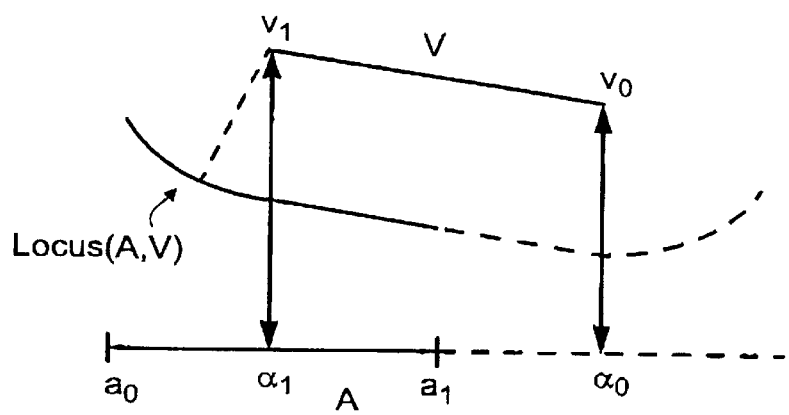
FIG. 9 is another example of a representation of the locus of two line segments.
Figure 12B:
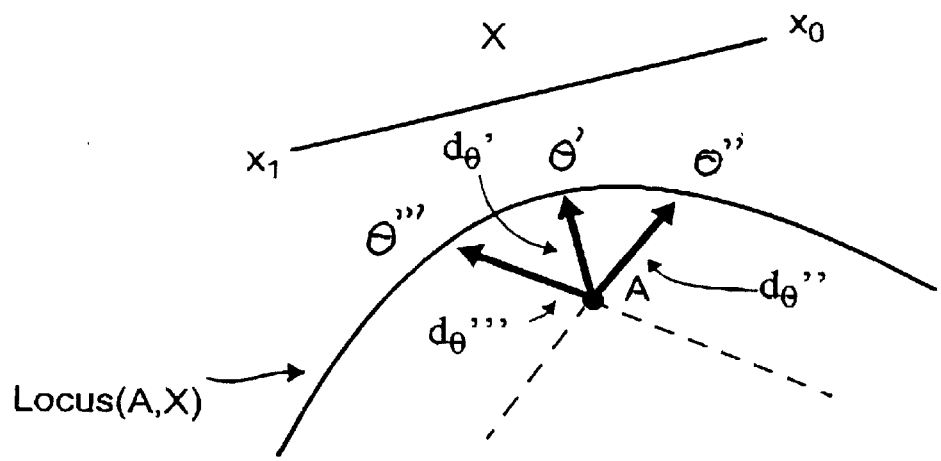
FIG. 12B shows the locus distance of the example shown in FIG. 12B.
Figure 12A:
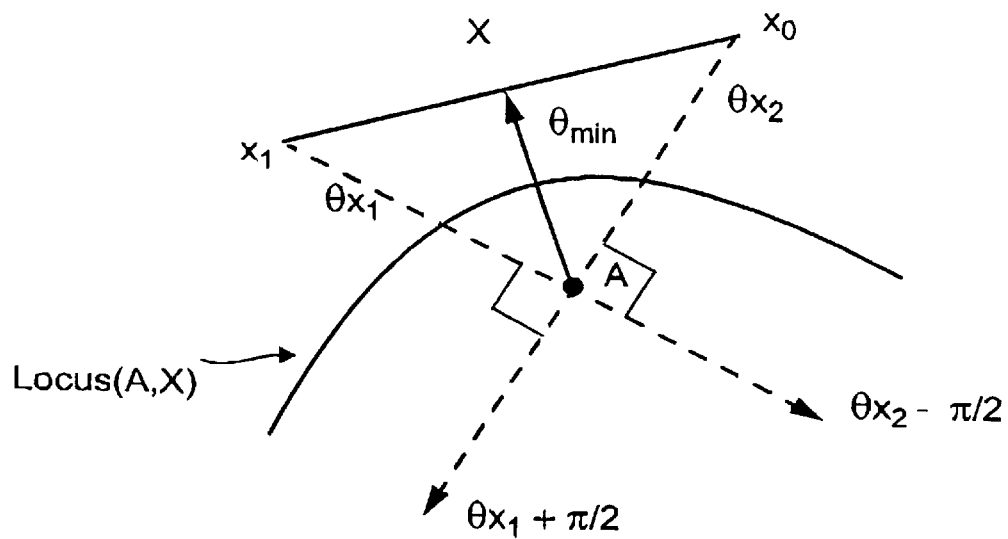
FIG. 12A is another example of a representation of the locus of a concave vertex and a line segment.

The term "locus (i,j)" refers to the locus of points equidistant from two elements i and j, where i is a line segment or concave vertex and j is a line segment. As one example, FIG. 5 shows the locus(A,R) of the line segment A and line segment R. The locus(A,R) is equidistant from the line segments A and R. FIGS. 6,8A, and 9 show other examples of a locus(i,j). As another example, FIG. 12A shows the locus(A,X) of the concave vertex A and line segment X. The locus is equisdistant from the vertex A and the line segment X.

Figure 8B:
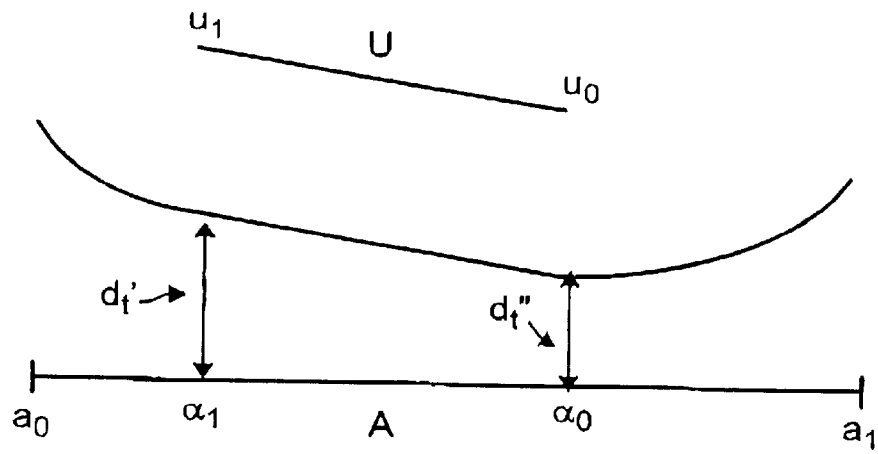
FIG. 8B shows the locus distance of the example shown in FIG. 8A.

The term "locus(i,j) distance function", in case of a line segment i, refers to a function where the perpendicular distance to the locus(i,j) from line segment i is a function of the parameter t. As an illustration, FIG. 8B shows the locus distance(A,U) for a number of parameter values. Namely, the locus distance(A,U) at parameter value $\alpha_1$ is $d_t'$ and the locus distance(A,U) at parameter value $\alpha_0$ is $d_t''$. It can be clearly seen that the locus distance (A,U) is a function of the parameter values t.

In the case of a concave vertex i, the term "locus(i,j) distance function" refers to a function where the radial distance to the locus(i,j) from concave vertex i is a function of the parameter θ. As an illustration, FIG. 12B shows the locus distance function(A,X) for a number of parameter values. Namely, the locus distance at parameter value θ' is $d_\theta'$, at parameter value θ" is $d_\theta''$, and at parameter value θ'" is $d_\theta'''$. It can be clearly seen that the locus distance(AX) is as a function of the parameter values θ.

First Embodiment

Figure 16E:
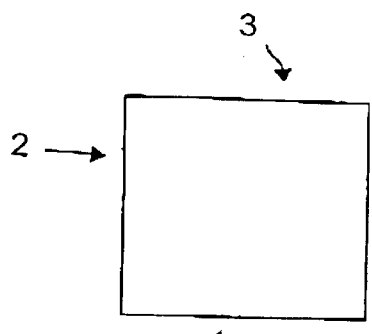
FIG. 16E shows a square derived from a character font outline.
Figure 16F:
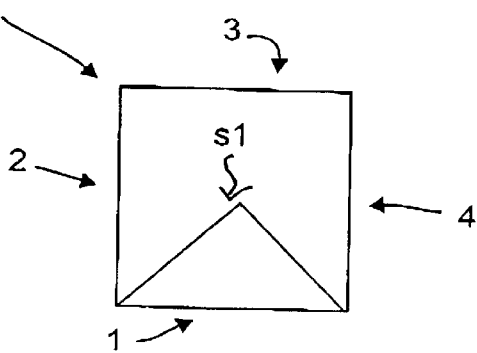
FIG. 16F shows the square of FIG. 16E and a partial skeleton generated by the method of FIG. 1.
Figure 16G:
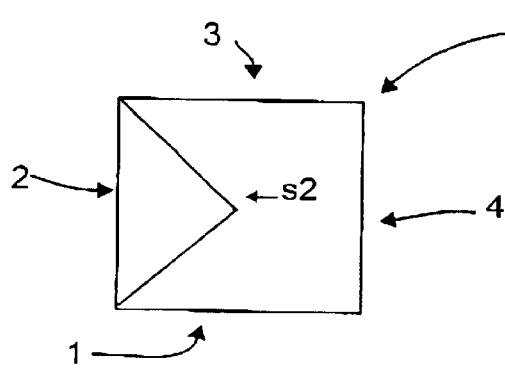
FIG. 16G shows the square of FIG. 16E and a partial skeleton generated by the method of FIG. 1.
Figure 16H:
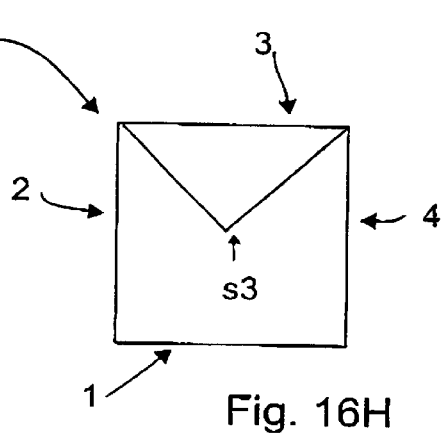
FIG. 16H shows the square of FIG. 16E and a partial skeleton generated by the method of FIG. 1.
Figure 16I:
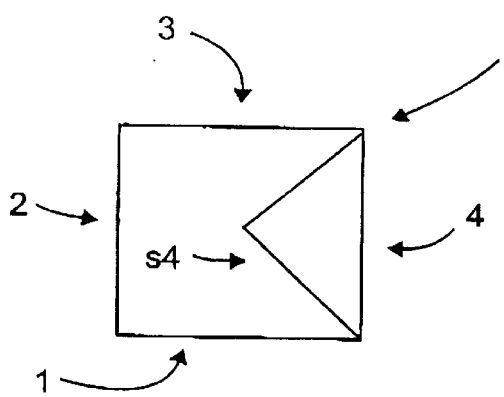
FIG. 16I shows the square of FIG. 16E and a partial skeleton generated by the method of FIG. 1.

A brief overview of the first preferred method is described in relation to an example shown in FIGS. 16E to 16J. FIG. 16E shows a square 1600E before the commencement of the first preferred method. The first preferred method first compares line segment 1 against each line segment 2, 3, and 4 in turn and builds a partial skeleton $S_1$ as shown in FIG. 16F. The first preferred method then compares line segment 2 against each line segment 1,3, and 4 and builds a partial skeleton $S_2$ as shown in FIG. 16G. It then compares line segment 3 against line segments 1,2, and 4 and builds a partial skeleton $S_3$ as shown in FIG. 16H. It then further compares line segment 4 against line segments 1, 2, and 3 and 4 and builds a partial skeleton $S_4$ as shown in FIG. 16I.

Figure 16J:
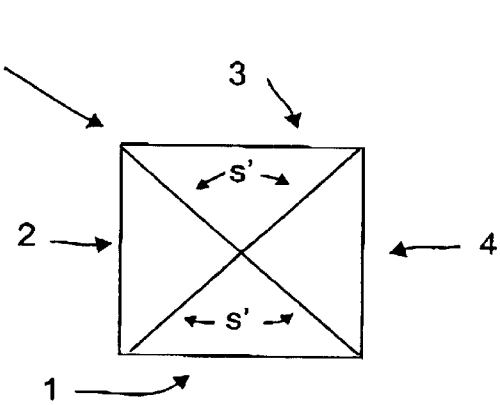
FIG. 16J shows the square of FIG. 16E and the total skeleton generated by the method of FIG. 1.
Figure 17:
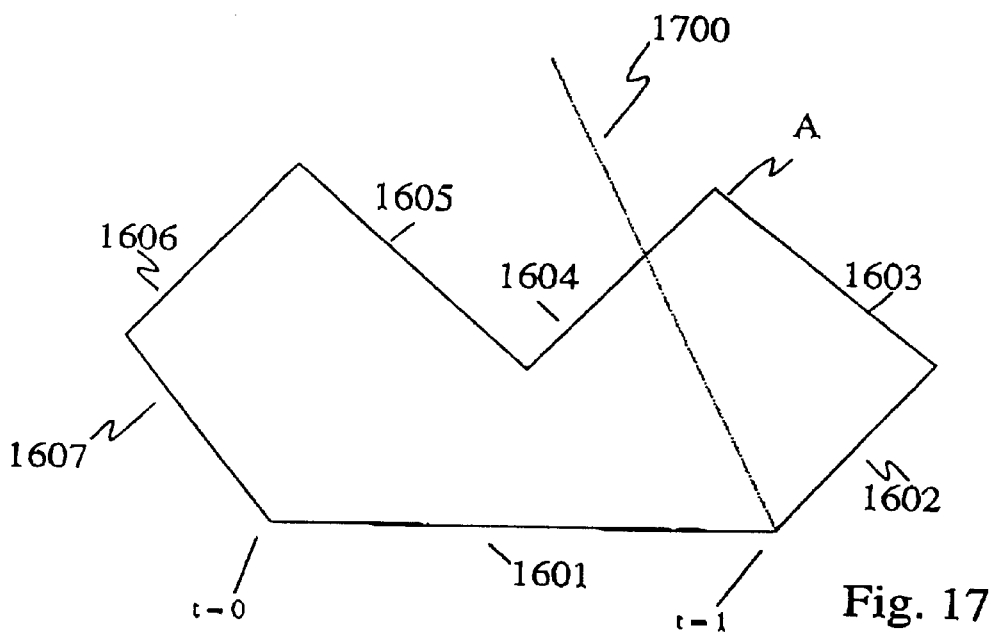
FIG. 17 shows the polygon of FIG. 16D and an incomplete partial skeleton generated by the method of FIG. 1.
Figure 18:
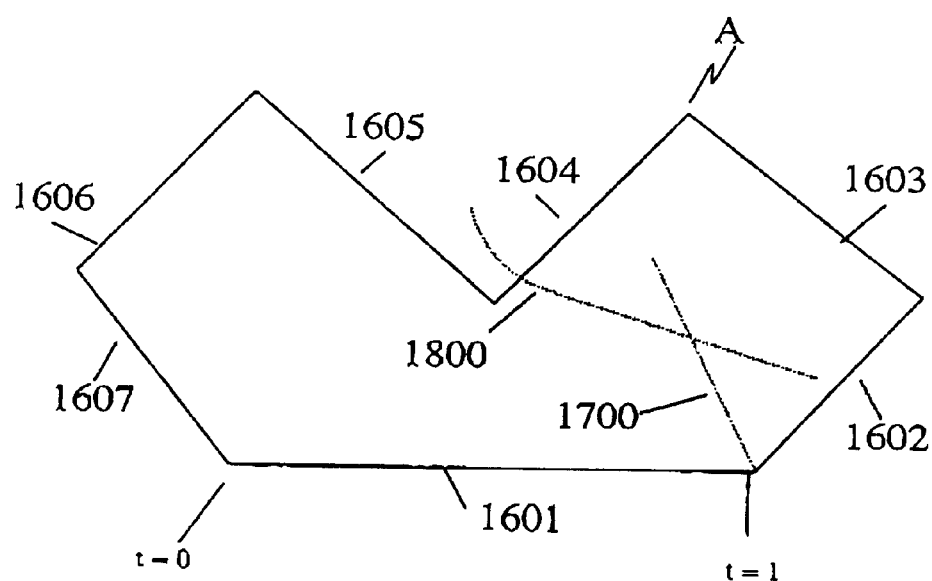
FIG. 18 shows the polygon of FIG. 16D and an incomplete partial skeleton generated by the method of FIG. 1.
Figure 19:
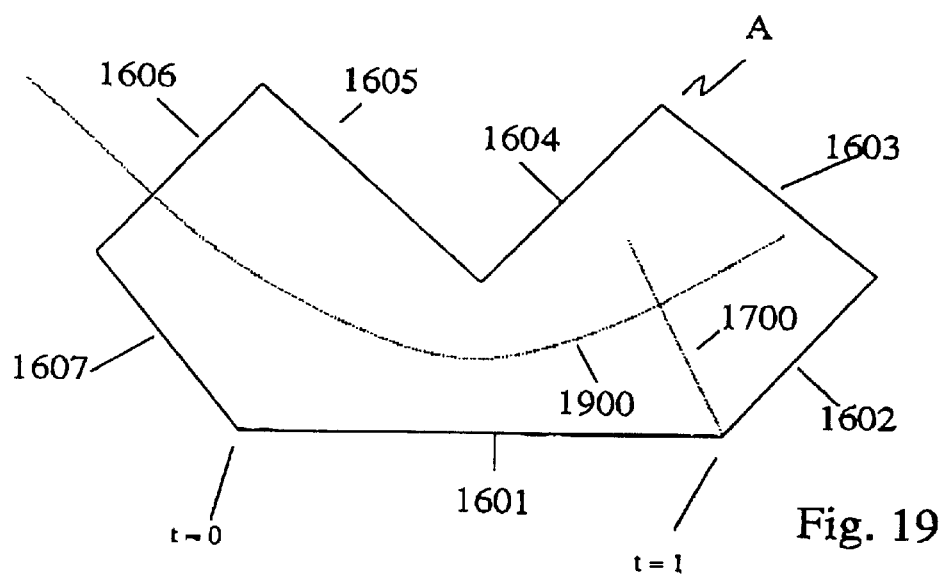
FIG. 19 shows the polygon of FIG. 16D and an incomplete partial skeleton generated by the method of FIG. 1.
Figure 20:
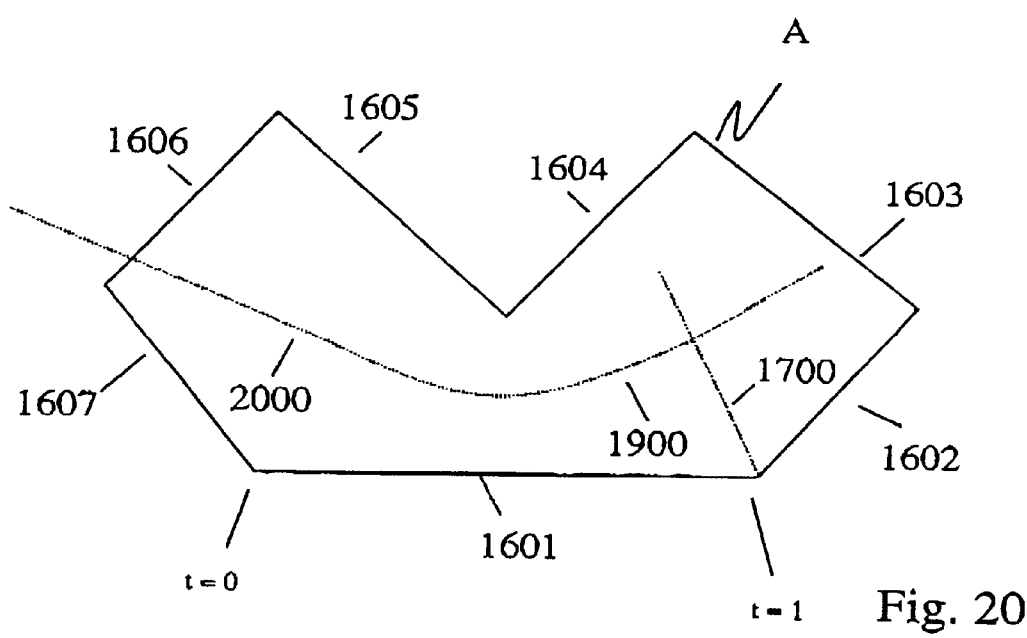
FIG. 20 shows the polygon of FIG. 16D and an incomplete partial skeleton generated by the method of FIG. 1.
Figure 21:
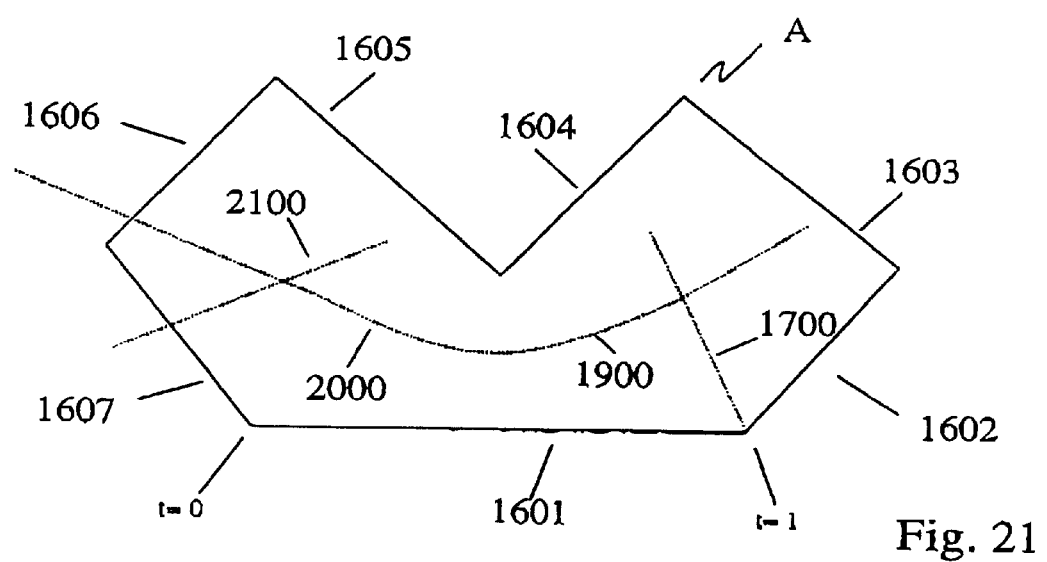
FIG. 21 shows the polygon of FIG. 16D and an incomplete partial skeleton generated by the method of FIG. 1.
Figure 22:
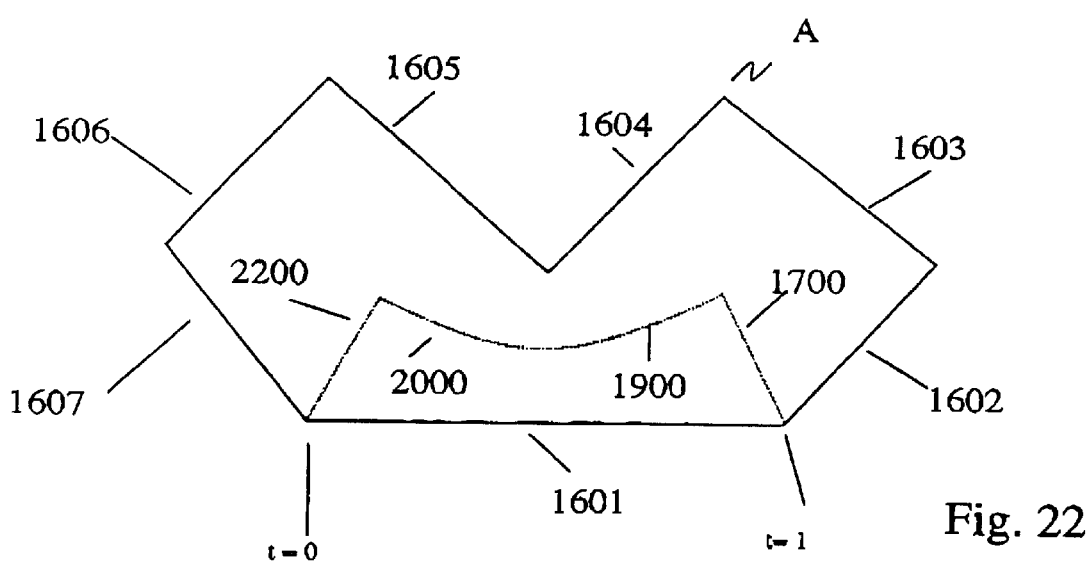
FIG. 22 shows the polygon of FIG. 16D and the completed partial skeleton generated by the method of FIG. 1.

Finally, the first preferred method then builds the total skeleton S' by generating the union of the partial skeletons $S_1, S_2, S_3,$ and $S_4$ as shown in FIG. 16J.

FIG. 1 illustrates a flow diagram of a first preferred method for generating a geometric skeleton of a polygonal shape. The FIG. 1 illustrates in more detail the operations of the first preferred method, particularly on how the partial skeletons are built.

The method commences at step 100 and any necessary processes and parameters are initialized. For instance, counters i and j are initialized to zero.

In the next step 102, a character font outline, which may be stored in a quadratic B-spline format, is accessed from memory. Alternatively, the character font outline may be implicitly generated. Next, the character font outline is then approximated to a polygonal shape consisting of line segments and vertices for processing by the method.

Such a polygonal shape can include multiple boundaries which individually are polygons. These polygons may describe simple connected shapes, disjoint areas and/or complex shapes with excluded sub-areas. The method then labels each line segment and vertex of the polygonal shape in order and stores associated positional information defining each line segment and vertex. Preferably, the line segments are defined by each of their end points in (x,y) co-ordinates. Similarly, the vertices are defined by (x,y) co-ordinates. After step 102, the processing continues at step 104.

In step 104, the method selects an ith line segment or concave vertex of the polygonal shape. Preferably, the ith line segments and concave vertices are selected in a sequential order around the boundary of the polygonal shape. This is achieved by incrementing in order through the labelled line segments and concave vertices by means of counter i. In the method, each selected ith line segment is represented by a parametric representation where the parameter value is zero (0) at the start of line segment i and the parameter value is one (1) at the end of the line segment i. The present description refers to a t-value as being a value of the above-mentioned parameter. Also each selected concave vertex is represented by a parametric representation where the parameter values θ vary between $\theta_0$ and $\theta_1$. In the latter case, a θ-value refers to a value of this parameter.

During step 104, the method also initializes a list L(i) of significant parameter values The method creates a new and separate list L(i) for each selected line segment or concave vertex i. These lists L(i) are capable of containing a number of members where each member is of the form (t,B), where B represents a jth line segment in the polygon and t represents a parameter value.

In the case of a selected line segment i, the list L(i) when initialized contains the following entries (0,NULL) and (1,NULL). The NULL value indicates that a line B has not been selected. The values 0 and 1 represent parameter values (t-values).

In the case of a selected concave vertex i, the list L(i) when initialized contains the following entries ($\theta_1$,NULL) and ($\theta_2$,NULL). The NULL value indicates that a line B has not been selected. The values $\theta_1$ and $\theta_2$ represent parameter values (θ-values).

This initialised list L(i) is updated a number of times during processing as will be explained in more detail below with regard to steps 108,110, and 112. In addition, the members of the list L(i) are maintained during processing in order of ascending t-values. The list L(i) is completed once all jth line segments have been processed. Once completed, the list L(i) describes that portion of the skeleton (see eqn 1) contributed by line segment i or concave vertex i when compared with all the remaining line segments j. Namely, the completed List(i) for a line segment i contains a plurality of members { ...,(t', N), ...,(t",P), ... }, where (t',N) and (t",P) are any members of the list, t' and t" are parameter values of a current line segment (i), and N and P are line segments of the polygon other than the current line segment (i). The t-values t' and t" are those t-values of the list which are adjacent in value. Preferably, the list is sorted according to t-values, and as such the members (t',N) and (t",P) are adjacent in the list. According to this list, the point of locus(i,N) on a line perpendicular to the current line segment (i) at the parameter value t' forms one point of the skeleton and a point of locus(i,P) on a line perpendicular to the current line segment (i) at the parameter value t" forms another point of the skeleton. In addition, for any parameter value t'" immediate t' and t" a point, being one of a point of locus (i,N) or a point of locus(i,P) on the line perpendicular to the current line segment (i) at the parameter value t'", which is closest to the current line segment (i) forms another point of the skeleton. On the other hand, the completed List(i) for a concave vertex i comprises a plurality of members { ...,(θ',N), ...,(θ",P), ... }, where (θ',N) and (θ",P) are any members of the list, θ' and θ" are parameter values of a current concave vertex (i), and N and P are said line segments of the polygon. The θ-values θ' and θ" are those θ-values of the list which are adjacent in value. Preferably, the list is sorted according to θ-values, and as such the members (θ',N) and (θ",P) are adjacent in the list. According to this list, a point of locus(i,N) on a radial line from the current concave vertex (i) at the parameter value θ' forms one point of the skeleton and a point of locus(i,P) on a radial line from the current concave vertex (i) at the parameter value θ" forms another point of the skeleton. In addition, for any parameter value θ'" immediate θ' and θ" a point, being one of a point of locus (i,N) or a point of locus(i,P) on the radial line from the current concave vertex (i) at the parameter value θ'", which is closest to the current concave vertex (i) forms another point of the skeleton After step 104, the processing continues at step 106, where a jth line segment is selected. Preferably, the jth line segments are selected in sequential order around the boundary of the polygonal shape. This is achieved by incrementing in order through the labelled line segments by means of counter j. Alternatively, any ordering may be used. Preferably, the jth line segment is selected in sequential order with the additional condition that j≠i when i is a line segment. Namely, it is not necessary to determine the locus of line i against itself.

During each pass of the next step 108, one or more new significant parameter values of the ith line segment or concave vertex are determined with respect to the jth line segment and added to the list of significant parameter values L(i), if not already present in the list L(i). The significant parameter value(s) are determined so that the locus(i,j) distance function between these significant parameter value (s) is monotonic and the locus(i,j) distance function between the endpoint and startpoint of line segment or vertex i and their closest significant parameter value(s) is also monotonic. In other words, the locus(i,j) distance function is monotonic moving away from the significant t-values. In the case of a selected i line segment, only one significant t-value need be selected, that being the t-value associated with the local minimum of the locus (i,j) distance function. In the event, this locus (i,j) distance function is monotonic over all the line segment i, then either the startpoint or endpoint of the line segment i (t-value=0 or t-value=1 respectively) can be selected as the significant parameter value. As these t-values are already in the List (i), it is not necessary to add them.

As mentioned above, the new significant parameter value (s) which are not already present in the list L(i) are added to the list L(i). The new significant parameter value(s) are added during step 108 as new members each of the form (n, k or k+1). The new member (n, k or k+1) contains the new significant t-value or θ-value n and either line k or k+1. These lines k and k+1 are selected from those two members of the current list L(i) having significant parameter values closest to and on adjacent sides of the significant parameter value of the new member. Whether the new member contains line k or line k+1 is dependent on the values of the locus distance function for lines k and k+1 at the significant parameter value n. The new member will contain line k, if the locus distance (A,k) function is less than the locus distance (A,k+1) function at parameter n. Otherwise, it will contain line k+1. The newly updated list L(i) is then sorted in order of ascending t-values or θ-values, as the case may be. At this stage, the newly updated list L(i) does not contain any reference to the current line segment j. The list L(i) defines only the skeleton as far as line segment i or concave vertex i and line segments zero to j−1. The method will update the newly updated list L(i) for current line segment j, if necessary, in step 112.

Figure 2:
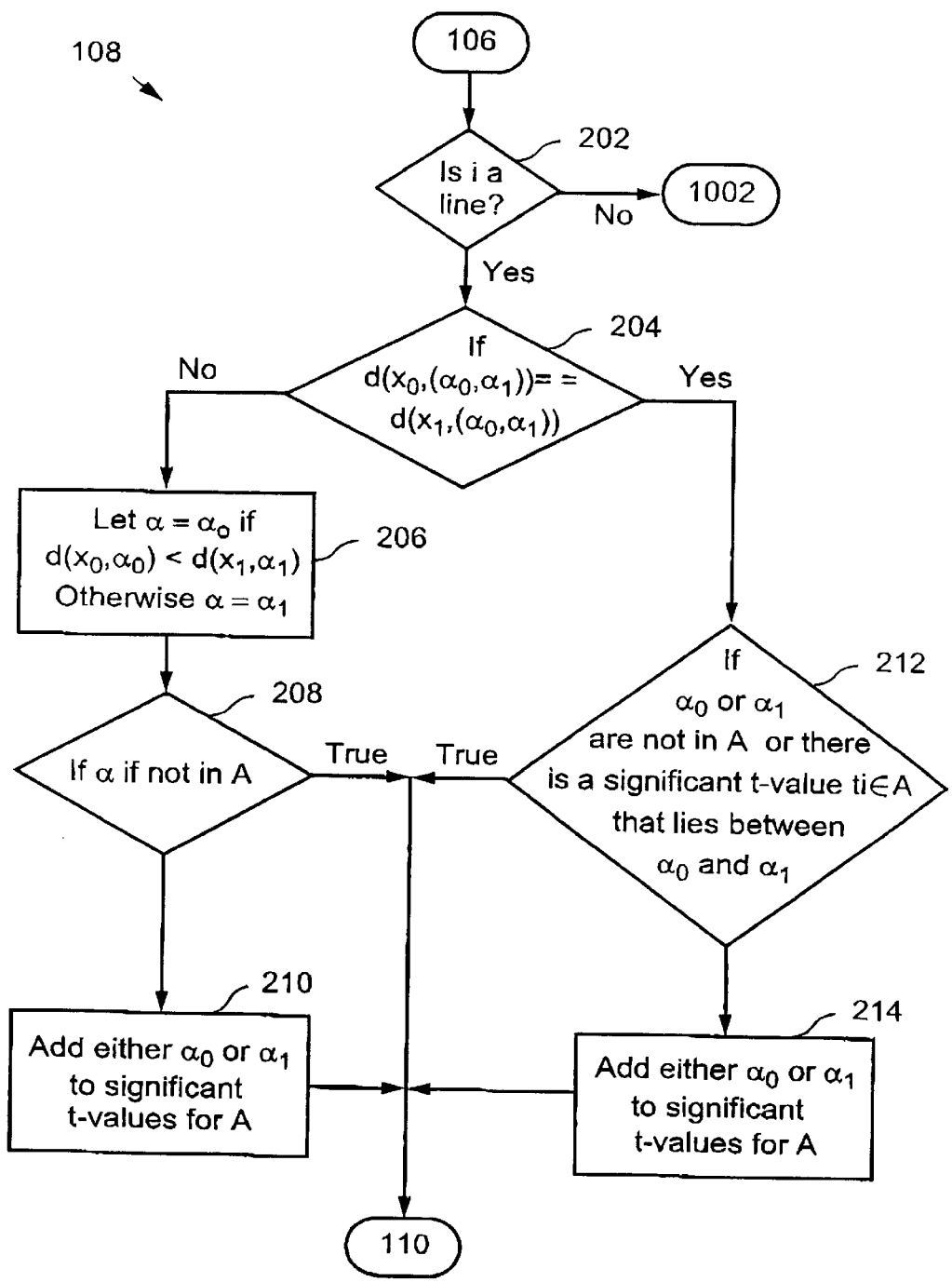
FIG. 2 is a flow diagram of the process of determining t-values as used in the method of FIG. 1.

Turning now to FIG. 2, there is shown a flow diagram of the process 108 of determining t-values as used in the method of FIG. 1. Specifically, this process determines the t-values for the selected ith and jth line segments. This process is first explained with reference to FIGS. 5,6,7,8A and 9.

Turning now to FIG. 8A there is shown an example of a representation of a selected ith line segment A and a selected jth line segment U. The line segment A has endpoints $a_0$ and $a_1$ and the line segment U has endpoints $u_0$ and $u_1$. The parameter values are zero(0) at $a_0$ to one(1) at $a_1$. The process 108 selects significant parameter value(s) so that the locus(i,j) distance function between the selected significant parameter value(s) is monotonic and the locus(i,j) distance function between the endpoints of the ith line segment and their closest significant parameter values(s) is also monotonic. That is, the locus(A,U) distance function is monotonic when moving away from any of the significant t-value(s). Preferably, the t-values 0 and 1 are already present in the list L(i) of significant parameter values. The chosen significant t-value will correspond to the minimum of the locus(A,U) distance function, if it is interior to A. Assuming u is a member of U and is the closest point to A, then unless U and A are parallel, u will be endpoint of U. Thus in this example, the significant t-value will that be that t-value closest to u, namely $\alpha_0$. Otherwise, locus(A,U) distance function is not monotonic at $\alpha_0$. A new member having this new significant t-value will then be added to the list, if this t-value is not already in the list. The line component of this new member is determined in the manner described above.

Turning now to FIG. 9 there is shown another example of a representation of selected ith line segment A and a jth line segment V. In this example, $\alpha_0$ is not within A and the locus(A,V) distance is monotonic across all of A. Thus the significant t-value in this case will be 1 corresponding to endpoint $a_1$. As this significant t-value is already in the list L(i) of significant parameter values there is no need to add it.

Turning now to FIG. 5, there is shown another example of a representation of selected ith line segment A and a jth line segment R. In this example, A and R are parallel and both $\alpha_0$ and $\alpha_1$ are within A. Thus a significant t-value in the range $[\alpha_0, \alpha_1]$ is required. The t-value of $\alpha_0$ is chosen as a significant t-value in this example. A new member having this new significant t-value will then be added to the list, if this t-value is not already in the list. The line component of this new member is determined in the manner described above.

Turning now to FIG. 6, there is shown another example of a representation of selected ith line segment A and a jth line segment S. In this example, A and S are parallel and only $\alpha_1$ is within A. In this example, the locus(A,S) distance function is monotonic across all of A. Thus the significant t-value is 1 in this example. As this significant t-value is already in the list L(i) of significant parameter values there is no need to add it.

Figure 7:
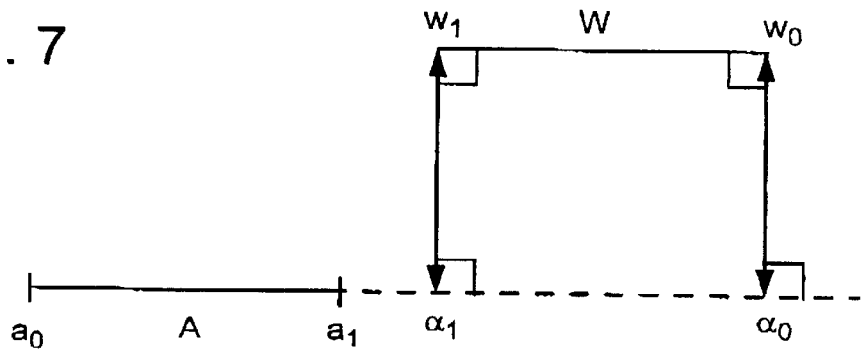
FIG. 7 is another example of a representation of the locus of two parallel line segments.

Turning now to FIG. 7, there is shown another example of a representation of selected ith line segment A and a jth line segment W. In this example, A and W are parallel and both $\alpha_1$ and $\alpha_1$ are not within A. In this example, the locus(A,W) distance function is monotonic across all of A. No t-values are added to the list in this example.

Returning now to FIG. 2, the method of determining the significant t-values is described. After step 106, the processing continues at decision block 202, where a check is made whether the next selected ith line segment or concave vertex is a line segment. If the decision block returns true, the processing continues at decision block 204. Otherwise the processing continues at step 1002. In decision block 204, a check is made whether $d(x_0, (\alpha_0, \alpha_1)) == d(x_1, (\alpha_0, \alpha_1))$. Namely, a check is made whether the distance of the projection of the endpoint $x_0$ of selected jth line X onto selected ith line A equals the distance of the projection of the end point $x_1$ of the selected jth line X onto the selected ith line A. In this way, it is possible to determine whether the selected ith line A and jth line X are parallel.

If the decision block 204 returns false (no) processing continues at step 206 where the t-value $\alpha$ is set to is set to $\alpha_0$ if $d(x_0, \alpha_0) < d(x_1, \alpha_1)$, otherwise the t-value $\alpha$ is set to $\alpha_1$. In this way, the t-value is set to the t-value corresponding to the endpoint of X which has the lessor value of the locus distance function. After step 206, the processing continues at decision block 208, where a check is made whether the t-value at is not in A. If the decision block 208 returns true, then the processing continues at step 110. Otherwise, the processing continues at step 210, where a new member having the new significant t-value $\alpha_0$ or $\alpha_1$ for A will then be added to the list, if this t-value is not already in the list. The line component of this new member is determined in the manner described above. After step 210 the processing continues at step 110.

If the decision block 204 returns true (yes) processing continues at decision block 212 where a check is made whether $\alpha_0$ or $\alpha_1$ are not in A or there is a significant t-value belonging to A that lies between or including $\alpha_0$ and $\alpha_1$. If the decision block 212 returns true, the processing continues at step 110. Otherwise the processing continues at step 214, where a new member having either the significant t-value $\alpha_0$ or $\alpha_1$ will then be added to the list, if this t-value is not already in the list. The line component of this new member is determined in the manner described above. After step 214, the processing continues at step 110.

Figure 10:
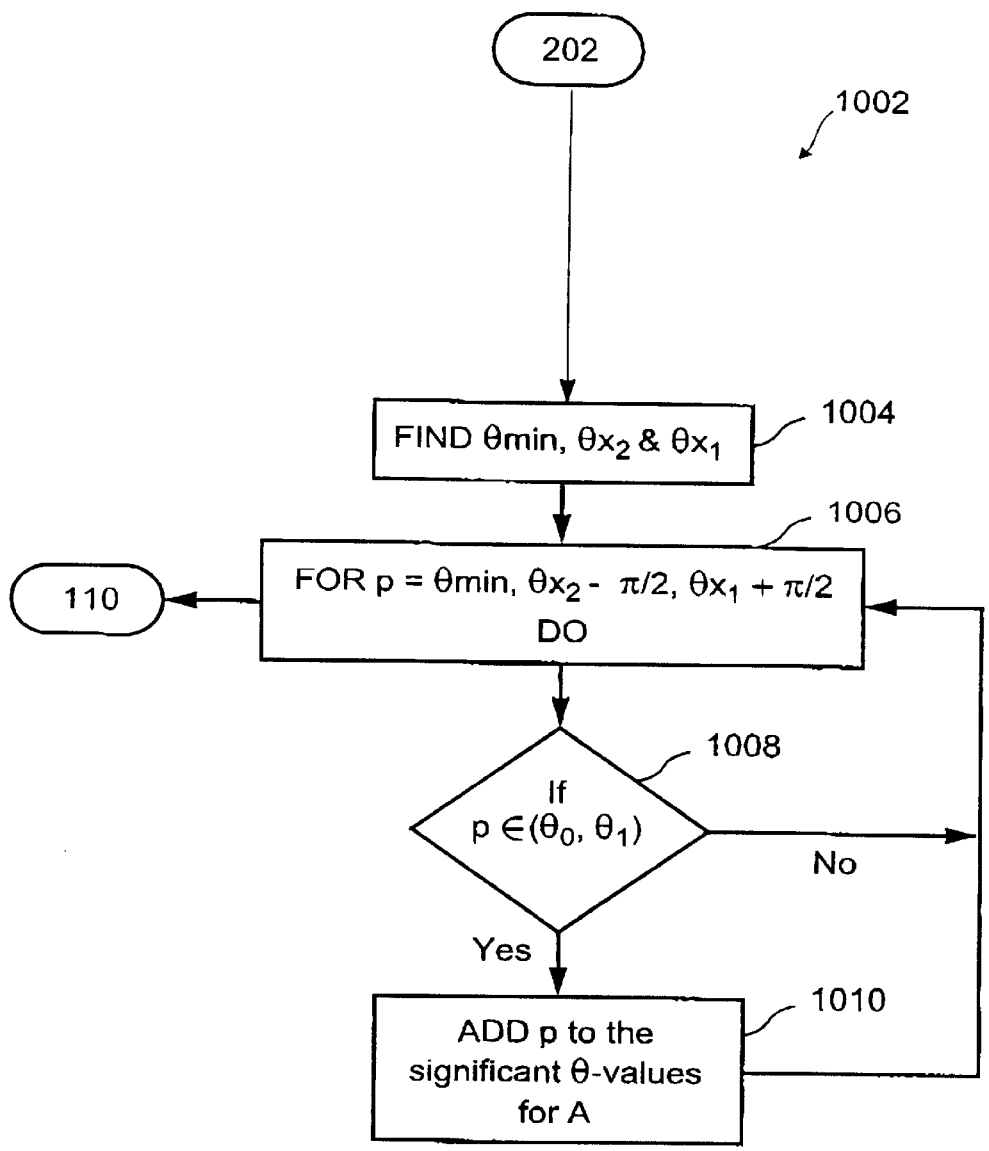
FIG. 10 is a flow diagram of the process of determining θ-values as used in the method of FIG. 1.

Turning now to FIG. 10, there is shown a flow diagram of the process 1002 of determining θ-values as used in the method of FIG. 1. In the decision block 202 (FIG. 2) a check is made whether the ith selection is a line segment. If the decision block returns false, the processing continues at step 1004 of FIG. 10. Specifically, this process determines the θ-values for the selected ith convex vertex and jth line segments. This process is first explained with reference to FIGS. 11, 12A, and 13.

Turning now to FIG. 11, there is a shown an example of a selected ith concave vertex A and selected jth line segment X. The concave vertex A is formed by line segments B and C, and is concave with respect to the interior of the polygonal shape. The jth line segment X has end points x0 and x1. In the case of the selected ith concave vertex A, the vertex is parameterized having θ-values with period $2\pi$. The values $\theta_1$ and $\theta_2$ correspond to the angles of the vectors extending from A and which are perpendicular to line segments B and C respectively. The θ-values of the concave vertex A are limited to the range $\theta_1$ and $\theta_2$. The significant θ-values are selected within this range so that the locus(i,j) distance function between the concave vertex i and line segment j is monotonic between each pair of adjacent selected θ-values in concave vertex i and monotonic between the endpoint(s) $\theta_1$ and $\theta_2$ and the selected θ-values adjacent thereto. In other words, the locus(i,j) distance function is monotonic when moving away from any significant t-value. In this case, significant θ-values corresponding to minima and maxima in the locus(i,j) distance function are selected and may be added to the stored list L(i) in the form of new members, if not already present in the list L(i). The line component of this new member is determined in the manner described above.

FIG. 12A shows another example of a selected ith concave vertex A and selected jth line segment X. The line segments B and C, values $\theta_1$ and $\theta_2$ are not shown for the sake of clarity. The $\theta_{min}$ value corresponds to that direction having a minimum distance between line segment X and concave vertex A. The values $\theta_{x1}$ and $\theta_{x0}$, correspond to the angle of the vectors $Ax_1$ and $Ax_0$ respectively. Considering the locus(X,A) as a function of θ, the locus(x,A) has two asymptotes, which are maxima, which correspond to the endpoints $x_1$ and $x_0$. These maxima are $\theta_{x1} + \pi/2$ and $\theta_{x0} - \pi/2$.

Figure 13:
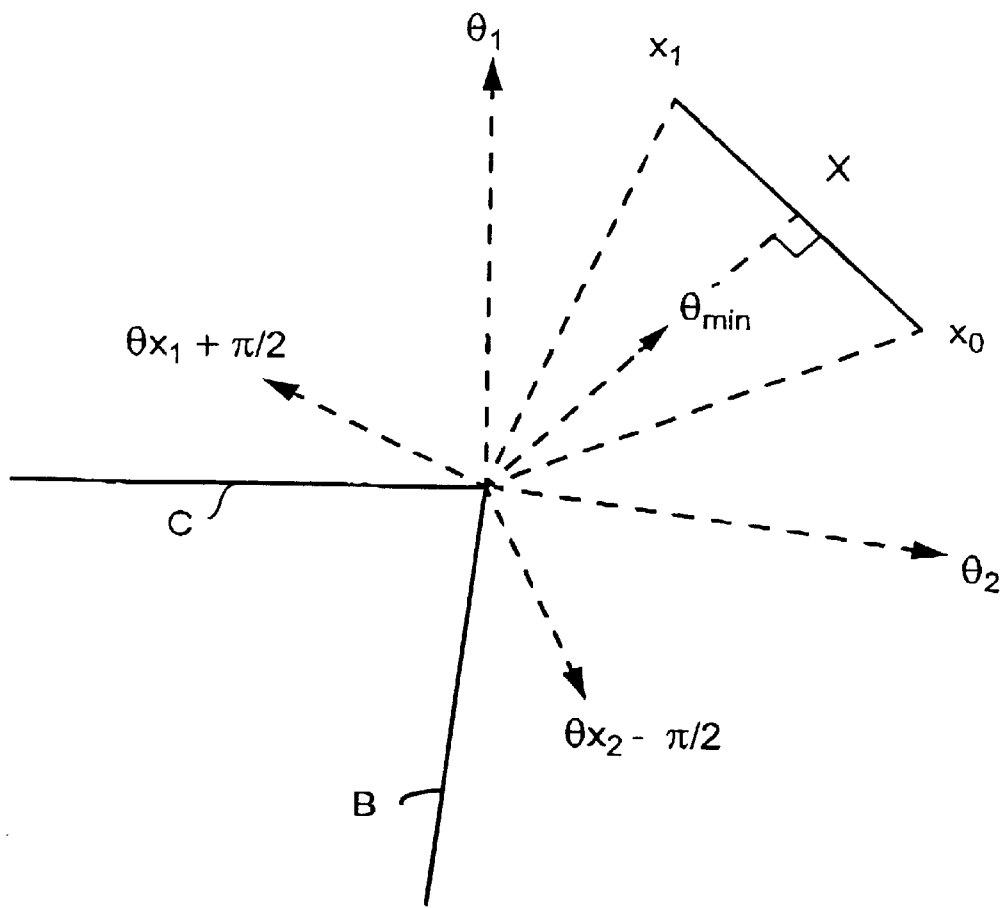
FIG. 13 is another example of a representation of the locus of a concave vertex and a line segment.

FIG. 13 shows another example of a selected ith concave vertex A and selected jth line segment X. As mentioned above, the significant θ-values correspond to minima and maxima in the locus(x,A) distance function within the range $\theta_1$ and $\theta_2$. As can be seen the $\theta_{min}$ value is within the range $\theta_1$ and $\theta_2$, whereas $\theta_{x0} + \pi/2$ and $\theta_{x0} - \pi/2$ are not. In this example, only $\theta_{min}$ is added to the significant θ values for A in the list L as a new member, if not already present in the list. The line component of this new member is determined in the manner described above.

Returning to FIG. 10, the process for determining θ-values will now be described. In step 1004, the values $\theta_{min}, \theta_{x2}$ and $\theta_{x1}$ are determined by coordinate geometry in a known manner. The processing then continues at step 1006. This step 1006 controls the operations of steps 1008 and 1010, whereby the operations of each step 1008 and 1010 are performed for each value $\theta min, \theta_{x2}$ and $\theta_{x1}$. Specifically, the variable p is set to each of the values $\theta_{min}, \theta_{x2}$ and $\theta_{x1}$ in turn. After step 1006, the processing continues at decision block 1008, where a check is made whether ρ is within the range $\theta_1$ and $\theta_2$. If the decision block 1008 returns false, then the processing returns to step 1006. If the decision block 1008 returns true, then the processing continues at step 1010 where ρ is added to the significant θ-values for A in the list L(i) as a new member, if not already in the list L(i). The line component of this new member is determined in the manner described above. After the completion of these operations 1008 and 1010 for each $\theta_{min}, \theta_{x2}$ and $\theta_{x1}$, the processing continues at step 110.

Returning now to Fig. 1, there is shown the processing step 110 which follows completion of step 108. In step 110, a comparison is made between adjacent significant parameters values associated with loci($i,j_k$) and loci($i,j_{k+1}$) to determine whether there exists another loci(i,j) having an intermediate parameter value for which the loci(i,j) is closer to the line segment i or concave vertex i than either the loci($i,j_k$) or loci($i,j_{k+1}$). If there exists another closer locus (i,j) then it's intermediate parameter value may be added as a member to the list L(i). This process 110 is undertaken on both the line segments i and concave vertices i in functionally the same manner. Thus for ease of explanation, the processing step 110 is described only with reference to a line segment i.

Figure 3:
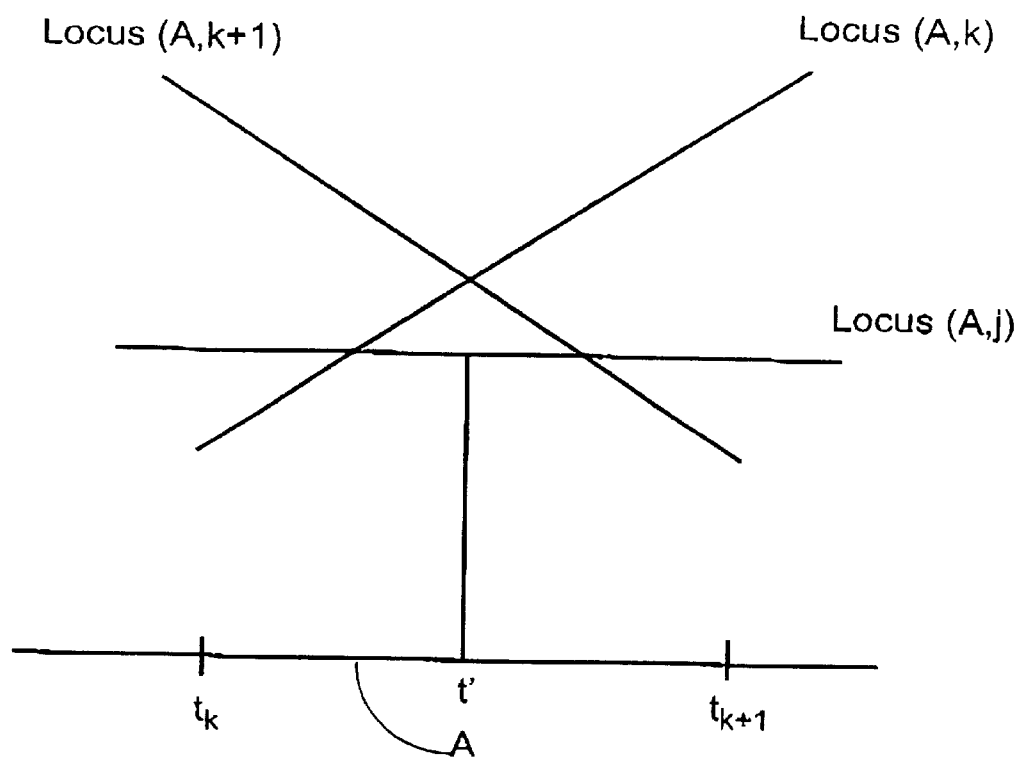
FIG. 3 is a representation of an example of a line segment and three loci.

Turning now to FIG. 3, there is shown an example of a line segment and three loci. The selected ith line segment A has two significant t-values $t_k$ and $t_{k+1}$ corresponding to the locus(A,k) and locus(A,k+1) which are representative of the skeleton at those points. However, it does not necessary follow that the skeleton of A between t-values $t_k$ and $t_{k+1}$, but exclusive of those values, will consist of locus(A,k) and locus(A,k+1) only There may exist another locus(A,j) that is closer to A than either of the other two loci, intermediate the t-values $t_k$ and $t_{k+1}$. Such a locus(A,j) is shown in the example of FIG. 3 having an intermediate t-value t'. The existence of such a intermediate t-value is determined by eqn (2) of the following three-way test.

Figure 4A:
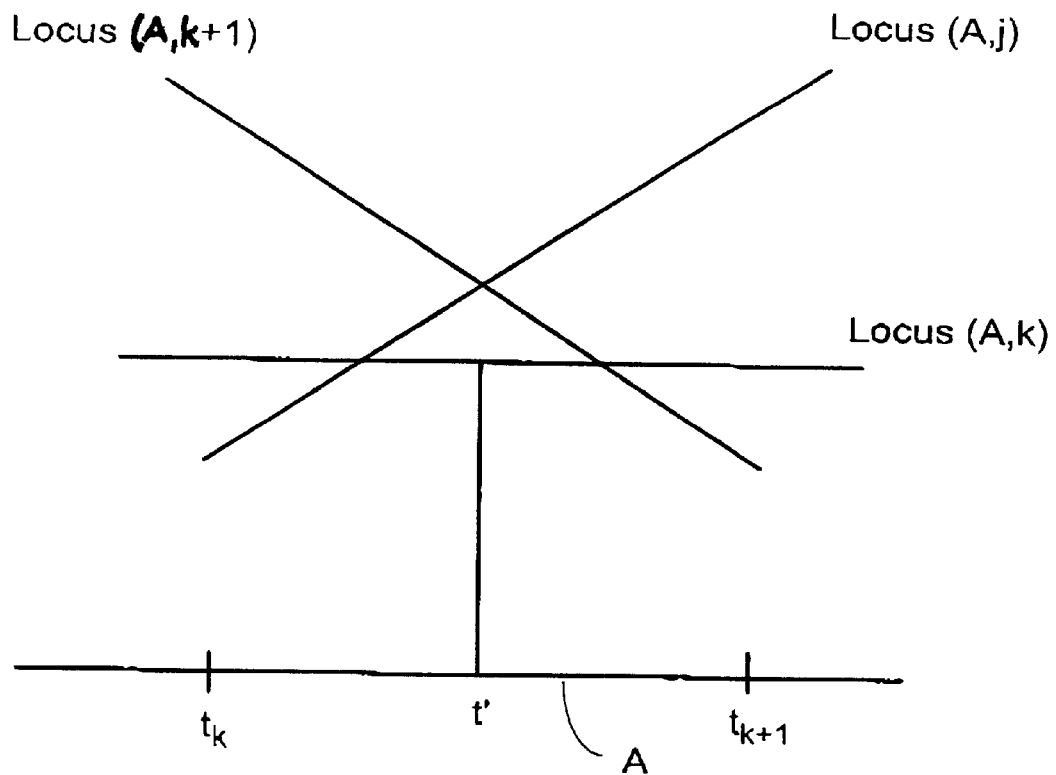
FIG. 4A is a representation of another example of a line segment and three loci.

Turning now to FIG. 4A, there is shown another example of a line segment and three loci. The selected ith line segment A has two significant t-values $t_k$ and $t_{k+1}$ corresponding to the locus(A,k) and locus(A,k+1) which are representative of the skeleton at those points. In this example, contrary to FIG. 3, the locus(A,j) is closer than locus(A,k) at $t_k$ but locus(A,k) may have an intermediate value t' where locus(A,k) is closer than both locus(A,j) and locus(A,k+1). The existence of such an intermediate t-value is determined by eqn (3).

Figure 4B:
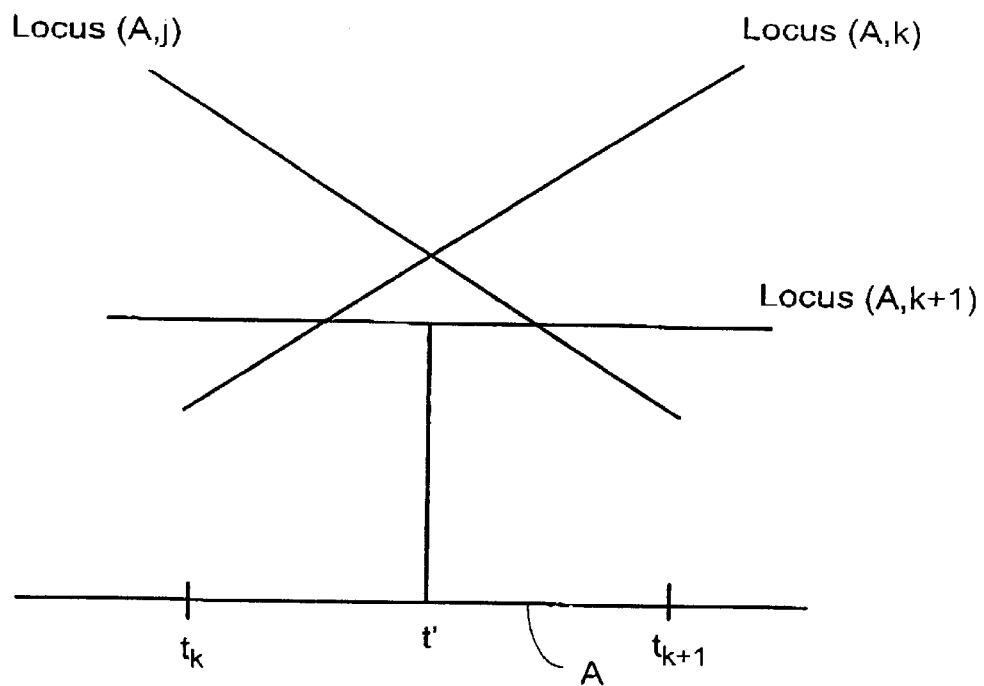
FIG. 4B is another representation of an example of a line segment and three loci.

Turning now to FIG. 4B, there is shown another example of a line segment and three loci. The selected ith line segment A has two significant t-values $t_k$ and $t_{k+1}$ corresponding to the locus(A,k) and locus(A,k+1) which are representative of the skeleton at those points. In this example, the locus(A,j) is closer than locus(A,k+1) at $t_{k+1}$ but locus(A,k+1) may have an intermediate value t' where locus(A,k+1) is closer than both locus(A,j) and locus(A,k). The existence of such an intermediate t-value is determined by eqn. (4).

Thus specifically the three-way test is as follows:

$$d(t_k, locus(A,k)) <= d(t_k, locus(A,j)) <= d(t_k, locus(A,k+1)) \text{ and}$$
$$d(t_{k+1}, locus(A,k+1)) <= d(t_{k+1}, locus(A,j)) <= d(t_{k+1}, locus(A,k)) \quad (2)$$

or $$d(t_k, locus(A,j)) <= d(t_k, locus(A,k)) <= d(t_k, locus(A,k+1)) \text{ and}$$
$$d(t_{k+1}, locus(A,k+1)) <= d(t_{k+1}, locus(A,k)) <= d(t_{k+1}, locus(A,j)) \quad (3)$$

or $$d(t_k, locus(A,k)) <= d(t_k, locus(A,k+1)) <= d(t_k, locus(A,j)) \text{ and}$$
$$d(t_{k+1}, locus(A,j)) <= d(t_{k+1}, locus(A,k+1)) <= d(t_{k+1}, locus(A,k)) \quad (4)$$

If this test returns true, then there may exist an intermediate t-value having a value $t_j$ and locus(A,j). However, this locus may not necessarily be any better in the interval ($t_k$ and $t_{k+1}$), that is any closer to A than either of locus(A,k) or locus(A,k+1). This is determined by the following "Is it better" test:

$$d(m, locus(A,j)) <= \min(d(m, locus(A,k)), d(m, locus(A,k+1))) \text{ or} \quad (5)$$
$$d(t_k, locus(A,j)) <= \min(d(t_k, locus(A,k)), d(t_k, locus(A,k+1))) \text{ or} \quad (6)$$
$$d(t_{k+1}, locus(A,j)) <= \min(d(t_{k+1}, locus(A,k)), d(t_{k+1}, locus(A,k+1))) \quad (7)$$

If this test returns true, then a new member (m, k or k+1) is added to the list of significant parameter values L(i). This new member contains the intermediate t-value m and either line k or k+1. These lines k and k+1 are selected from those two members of the current list L(i) having significant parameter values closest to and on adjacent sides of the significant parameter value of the new member. Whether the new member contains line k or line k+1 is dependent on the values of the locus distance function for lines k and k+1 at the intermediate t-value m. The new member will contain line k, if the locus distance (A,k) function is less than the locus distance (A,k+1) function at parameter m. Otherwise, it will contain line k+1. The newly updated list L(i) is then sorted in order of ascending t-values. At this stage, the newly updated list L(i) does not contain any reference to the current line segment j. The list L(i) defines only the skeleton so far as line segment i and line segments zero to j–1. The method will update the newly updated list L(i) for the current line segment j, if necessary, in step 112.

Figure 14:
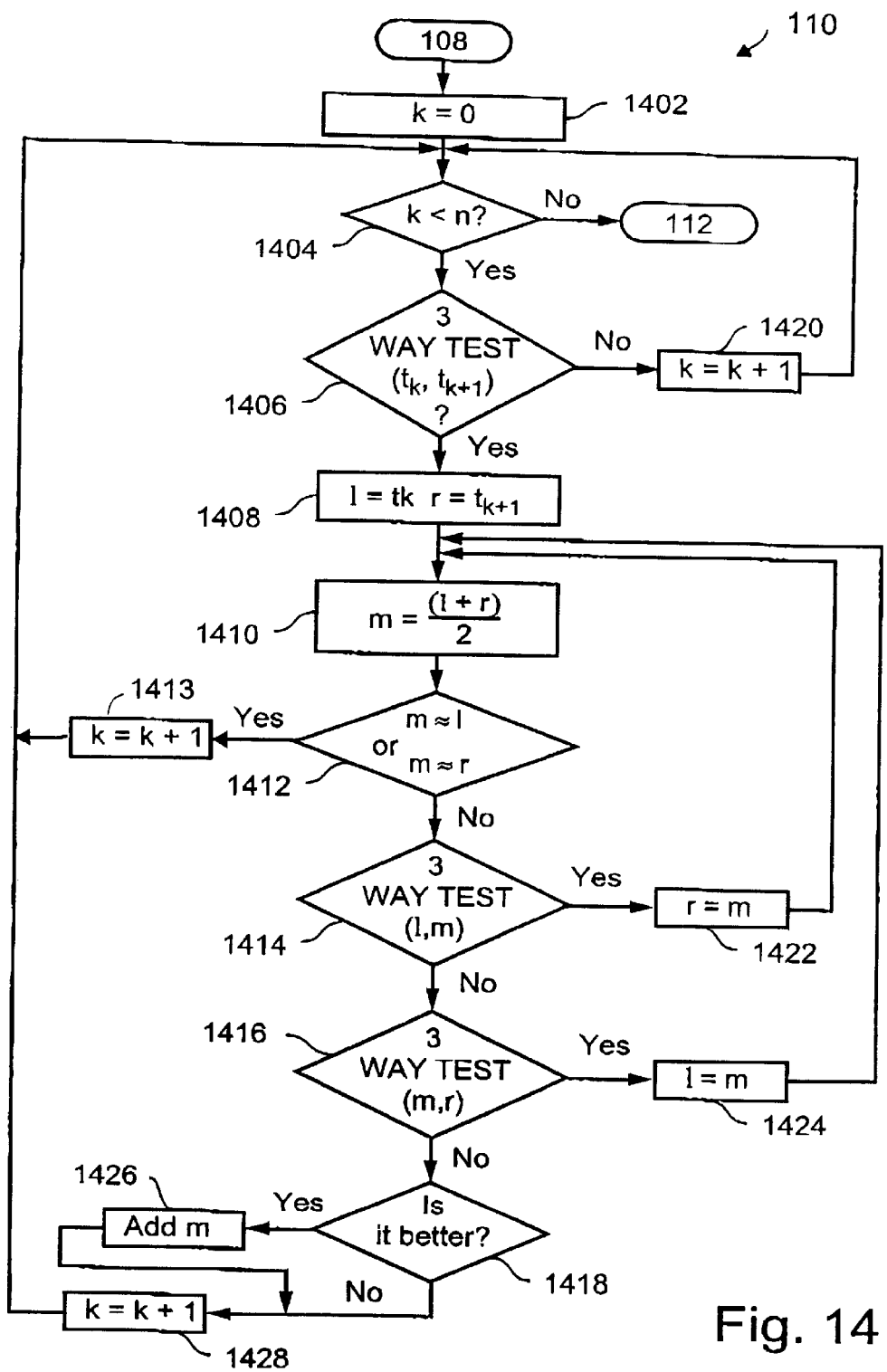
FIG. 14 is a flow diagram of the three way comparison process as used in the method of FIG. 1.

Turning now to FIG. 14, there is shown the three way comparison process 110 as used in the method of FIG. 1. Initially the variable k is set to zero at step 1402 and the processing continues at decision block 1406, where a check is made whether k is less than the number n of t-values in the list L(i). If the decision block returns false, then the processing continues at step 112. Otherwise, the processing continues at decision block 1406 where the three-way test, described above, is performed for t-values $t_k$ and $t_{k+1}$. If the three way test returns false, that is there are no potential intermediate t-values, then the process continues at step 1420 where k is incremented by one. In this way, the three-way test is applied to all adjacent t-values $t_k$ and $t_{k+1}$. If the decision block 1406 returns true, then the variable 1 is set to $t_k$ and the variable r is set to $t_{k+1}$. In the next step 1410 of the process, averaging the 1 and r variables derives a potential intermediate t-value. A three way test 1414 is again applied between the t-values I,m and again at 1416 between the values m,r. If both these three way test return false, then the processing continues at decision block 1418. If the decision block 1414 returns true however, the processing continues at step 1422 where r is set to m. Similarly, if the decision block 1416 returns true, then the processing continues at step 1424 where 1 is set to m. After both these steps 1424 and 1422, the processing returns to step 1410. It is in this way, those t-values between $t_k$ and $t_{k+1}$ are continually sub-divided until the potential intermediate t-value is found. After step 1410, a check 1412 is made whether m is substantially the same as 1 or r. If the decision block 1412 returns true, then processing returns to decision block 1404 via step 1413 where k is incremented by one, otherwise it continues at decision block 1414. This check in decision block 1412 prevents the process sub-dividing the t-value interval ad infinitum.

After decision block 1416, a "Is it better test" 1418, as described above, is conducted on the potential intermediate t-value m. If the "Is it better test" returns true, then the t-value m will be added to the list as a new member. The line component of this new member is determined in the manner described above. Afterwards the processing continues at step 1428. If the decision block 1418 returns false then, the processing continues at step 1428. In step 1428, the variable k is incremented by one and the processing is returned to decision block 1404, where the process continues for the next adjacent t-values if any.

As mentioned previously, the process 110 is also undertaken for the concave vertices i, that is for the θ-values.

Returning now to FIG. 1, there is shown the processing step 112 which follows the complewtion of step 110. In step 112 all the members of the list L(i) including the newly added members are compared against the current jth line segment and updated if necessary, At the end of this step 112, the updated list L(i) defines the skeleton for line segment i or concave segment i and line segments zero to j.

Figure 15:
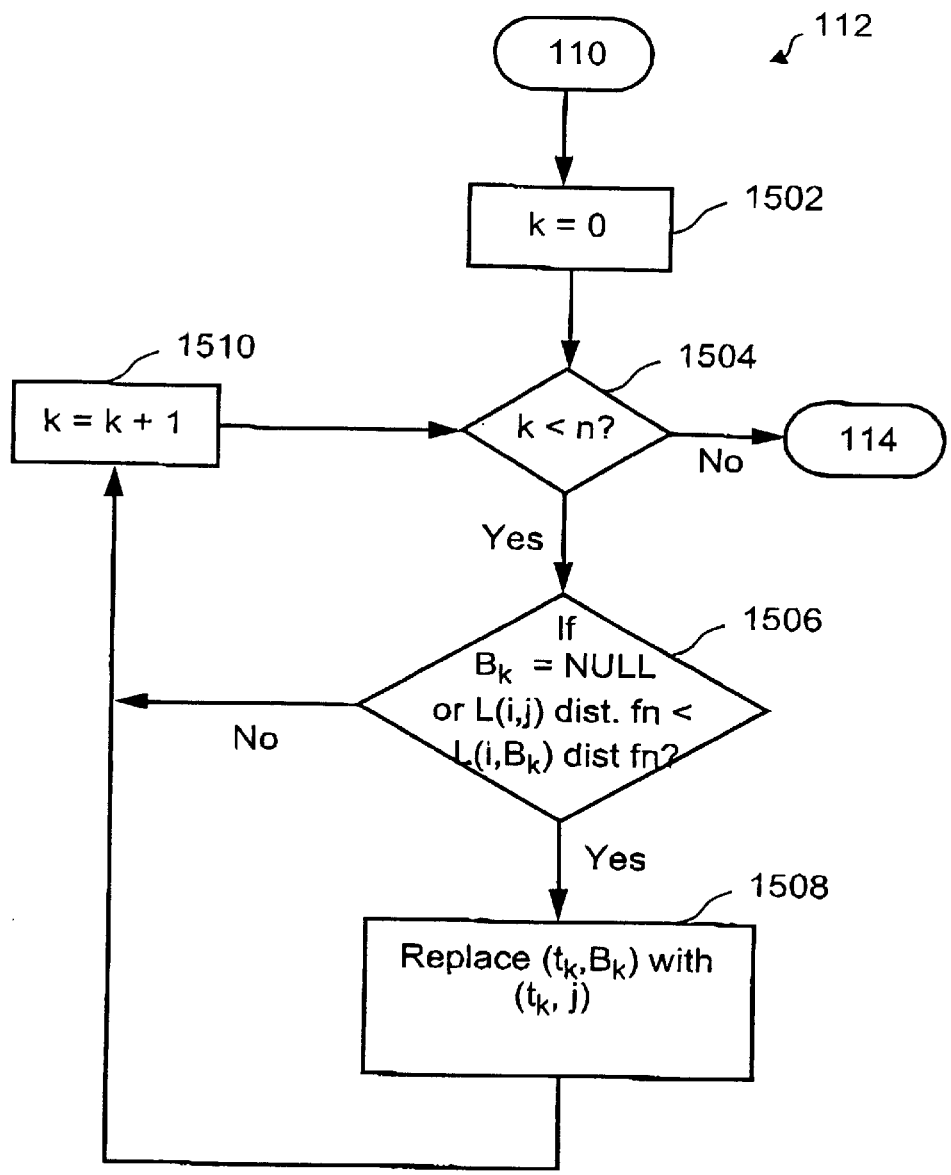
FIG. 15 is a flow diagram of the resetting process as used in the method of FIG. 1.

Turning to FIG. 15, there is shown a flow diagram of the process 112 used in the method of FIG. 1. In step 1502, a loop counter k is set to zero after which the processing continues at decision block 1504. In decision block 1504, a check is made whether the loop counter k is less than the number n of t-values in the list L(i). If the decision block 1504 returns true, then the processing continues at decision block 1506. In decision block 1506, a check is made whether the line $B_k$ of current member $(t_k, B_k)$ of the list L(i) is equal to Null or whether locus(i,j) distance function at $t_k$ is less than the locus(i,$B_k$) distance function at $t_k$. If the decision block 1506 returns true, then the processing continues at step 1508, where the current member $(t_k, B_k)$ of the list L(i) is replaced by the new member $(t_k, j)$. In this way, the method determines for each significant t-value, the loci closest to A. If however, the decision block 1506 returns false, then the processing continues at step 1510. Similarly after step 1508, the process continues at step 1510, where the loop counter k is incremented by one and the process is returned to decision block 1504. If decision block 1504 returns false, the processing continues to decision block 114.

Returning to FIG. 1, there is shown decision block 114 which follows the completion of step 112. In decision block 114, a check is made whether there exists any more jth line segments X. If the decision block 114 returns true, then the processing continues at step 116, where the variable j is incremented by one and then the processing is returned to step 106. It is in this way, that the method determines the contribution to the skeleton with respect to the ith line segment A or concave vertex A of all line segments j. Of course, the situation where j=i is irrelevant for determining the skeleton. In this particular case, j may be incremented again. If the decision block 114 returns false, then the processing continues at decision block 118. In this decision block 118, a check is made whether there any more ith line segments A or concave vertices A. If the decision block 118 returns true, then the variable i is incremented by one and the processing returned to step 104. Thus the method is able to determine the skeleton of each ith line segment A and concave vertex A. If the decision block 118 returns false, the processing continues at step 122.

In step 122, the members of each list L(i) are accessed and the distance from the boundary to the skeleton is obtained from the information contained in the List L(i). For example, a stored member (t=0,B) of the list L(A) indicates that one point of the skeleton is located at the loci(A,B) of lines A and B corresponding to t-value=0. The distance from the boundary at t-value=0 to the skeleton is d(t=0,Locus(A,B)). This distance information can be added to the member of the list L(A).

In step 124, all the Lists L(i) are output as a data signal for further processing by the image processing application. From these lists it is possible to calculate at any user-selected t-value the position of the skeleton. The skeleton will be the minimum of the loci associated with the t-values adjacent to the selected t-value. Alternatively, one consolidated list can be produced for all the line segments and concave vertices i. In addition, the lists can be further processed by removing any superfluous members.

After step 124, the processing terminates at step 126.

The C++ computer code shown in Appendix A is an example of a class suitable for use in the above-mentioned method. This code does not include the sub-processes for determining significant θ-values associated with locus(i,j), e.g. FIG. 10. A person skilled in the art could readily modify the following code to incorporate such sub-processes.

The operation of the method of FIG. 1 will now be briefly explained with reference to FIGS. 16D, 17 to 22. Turning now to FIG. 16D, there is shown an exemplary polygon A having sides 1601, 1602, 1603, 1604, 1605, 1606, and 1607 and a skeleton B generated by the method. FIGS. 17 to 22 show the construction of that part of skeleton B for the line segment (1601) only and gives the content of the List L(1601) for that line segment.

The method initialises the list L(1601) during step 104. As a result of the initialisation the List L(1601) contains two members as shown in Table A. These members mean that the skeleton is as yet undefined. In addition, the line segment 1601, is parameterised such that the parameter value (t-value) is zero (0) at the line start and one(1) at the line end.

TABLE A

| List L1601 | |
| --- | --- |
| Significant t-value | Corresponding line |
| 0 | NULL |
| 1 | NULL |

The method then processes j line segments 1602 to 1607 by selecting those lines in sequence for comparison against line 1601.

The method first processes line 1602 against line 1601. The list L(1601) remains the same until step 112 where the method (1506) determines that line associated with the first member of the list is NULL. The method then replaces the first member (0,NULL) of the list L(1601) with the member (0,1602). Similarly, the second member is replaced with new member (1,1602). The updated list L(1601) is shown in Table B which represents the partial skeleton shown in FIG. 17. The skeleton, as so far determined consists of only the single dashed line 1700, of which a portion is only shown.

TABLE B

| List L(1601) | |
| --- | --- |
| Significant t-value | Corresponding line |
| 0 | 1602 |
| 1 | 1602 |

The method then processes line 1603 against line 1601. No new significant t-values are added during steps 108 and 110. The method then determines during step 112 that the locus (1601,1603) distance fiction is less than the locus (1601,1602) distance function at t=0. Thus the first member of the list is replaced with the member (0,1603). On the other hand, the locus (1601,1603) distance function is greater than the locus (1601,1602) distance function at t=1. Thus the second member of the list is not replaced. The updated list L(1601) is shown in Table C which represents the partial skeleton shown in FIG. 18. The skeleton, as so far determined consists of the dashed lines 1700 and 1800.

TABLE C

| List L(1601) | |
|---|---|
| Significant t-value | Corresponding line |
| 0 | 1603 |
| 1 | 1602 |

The method then processes line 1604 against line 1601. During step 108, a significant t-value is determined at t=0.5, which is the local minimum of locus(1601,1604). Thus during step 108, a new member (0.5, 1603) is added to the list. The member (0.5, 1603) contains the line 1603 at this step in the processing (instead of line 1604). Namely, step 108 adds one of those lines (1602 or 1603) of the two members of the existing list L(1601) on each side of the new significant parameter value 0.5, having the lessor locus distance function at t=0.5. As the locus (1601,1603) distance function is less than the locus (1601,1602) function at the new t-value 0.5, then the new member at t=0.5 will contain line 1603.

The method then determines during step 110 that there is an intermediate t-value between t=0.5 and 1. The method determines that that there is intermediate t-value=0.8, where the locus(1601,1602) at this t-value is closer than both locus(1601,1603) and locus(1601,1604) (see Eqns 3 and 6). Thus during this step, a new member (0.8, 1602) is added to the list.

The method then proceeds to step 112, where the method considers all the t-values. As the locus (1601, 1604) distance function at t=0 is less than the locus distance function (1601,1603), the method replaces the existing member (0,1603) of the list with (0,1604). In addition, as the locus (1601,1604) distance function is less than the locus (1601, 1603) distance function at t=0.5, the method replaces the member (0.5, 1603) with the member (0.5,1604). On the other hand, as the locus (1601,1604) distance function is greater than the locus (1601,1602) function at t=0.8, the member (0.8,1602) is not replaced. The last member in the list is also unchanged. The updated list L(1601) is shown in Table D which represents the partial skeleton shown in FIG. 19. The skeleton, as so far determined consists of the dashed lines 1700 and 1900. As can be seen the skeleton line 1800 introduced from the processing of line 1603 has already been determined irrelevant and has been eliminated. The value at t=0.5 has been introduced because it has the smallest value for the locus distance function for line 1604.

TABLE D

| List L(1601) | |
|---|---|
| Significant t-value | Corresponding line |
| 0 | 4 |
| 0.5 | 4 |
| 0.8 | 2 |
| 1 | 2 |

The method then processes line 1605 against line 1601. During step 108, a significant t-value is determined at t=0.5, which is the local minimum of locus(1601, 1605). As this t-value already exists in the list L(1601), it is not added to the list. The method also determines during step 110 there are no intermediate t-values. During step 112, the method determines that the locus (1601,1605) distance function is less than locus (1601,1604) distance function at t=0 and the method replaces the first member of the list L(1601) with the new member (0,1605). On the other hand, the locus (1601, 1605) distance function is greater or equal to the other locus distance functions at the other t-values in the list and thus remaining members are not replaced. The updated list L(1601) is shown in Table E which represents the partial skeleton shown in FIG. 20. The skeleton, as so far determined consists of the dashed lines 2000, 1900, and 1700. As can be seen, the left hand side of the skeleton has changed from a parabola which was contributed from line 1604 to a straight line 2000 which is contributed by line 1605. This is indicated by the change of value 4 to 5 from Table D to E.

TABLE E

| List L(1601) | |
|---|---|
| Significant t-value | Corresponding line |
| 0 | 5 |
| 0.5 | 4 |
| 0.8 | 2 |
| 1 | 2 |

The method then processes line 1606 against line 1601. During step 108, the significant t-value is determined at t-value t=0, which is already in the list L(1601) and as such is not added to the list.

The method then determines during step 110 that there is an intermediate t-value between t=0 and 0.5. The method determines that there is an intermediate t-value=0.2, where the locus(1601,1605) at this t-value is closer than both locus(1601,1606) and locus(1601,1604) (see Eqns 3 and 6). Thus during this step, a new member (0.2, 1605) is added to the list.

During step 112, the method determines that the locus (1601,1606) distance function is less than locus (1601,1605) distance function at t=0 and the first member of the list L(1601) is replaced with the new member (0,1606). On the other hand, the locus (1601,1606) distance function is greater or equal to the other locus distance functions at the other t-values in the list and thus remaining members are not replaced. The updated list L(1601) is shown in Table F which represents the partial skeleton shown in FIG. 21. The skeleton, as so far determined consists of the dashed lines 2100, 1700, 1900, and 2000.

TABLE F

| List L(1601) | |
|---|---|
| Significant t-value | Corresponding line |
| 0 | 6 |
| 0.2 | 5 |
| 0.5 | 4 |
| 0.8 | 2 |
| 1 | 2 |

The method then processes line 1607 against line 1601. The method during step 108 determines that the significant t-value of line 1607 is t=0. As this t-value is already in the list L(1601) it is not added to the list.

The method then determines during step 110 that there is an intermediate t-value between t=0 and 0.2. The method determines that there is an intermediate t-value=0.1, where the locus(1601,1607) at this t-value is closer than both locus(1601,1606) and locus(1601,1605) (see Eqns 3 and 5). Thus during this step, a new member is added to the list at t-value t=0.1. This new member is added to the list as (0.1, 1606) as the locus (1601,1606) distance function is less than the locus (1601,1605) distance function at t=0.1.

During step 112, the method determines that the locus (1601,1607) distance function is less than locus (1601,1606) distance function at t=0 and thus the first member of the list L(1601) is replaced with the new member (0,1607). In addition, the method determines that the locus (1601,1607) distance function is less than the locus (1601,1606) distance function at t=0.1 and thus the new member (0.1, 1606) is replaced with the member (0.1, 1607). On the other hand, the locus (1601,1607) distance function is greater or equal to the other locus distance functions at the other t-values in the list and thus remaining members are not replaced. The updated list L(1601) is shown in Table G which represents the partial skeleton shown in FIG. 22. The skeleton, as so far determined consists of the dashed lines 2200, 2000, 1900, and 1700.

As can be seen, lines 1603 and 1606 do not contribute to the final skeleton. Furthermore the t-values 0.1 and 0.8 are redundant and could be removed in a subsequent pass over the list. From this list L(1601) it is possible to calculate at any user-selected t-value the position of the skeleton. For example, the skeleton is located at the locus(1601,1607) point at t=0. As another example, the skeleton is located at the locus(1601,1605) point or locus(1601,1604) point at t=0.3 which is closest to line 1601.

TABLE G

List L(1601)

| Significant t-value | Corresponding line |
| --- | --- |
| 0 | 7 |
| 0.1 | 7 |
| 0.2 | 5 |
| 0.5 | 4 |
| 0.8 | 2 |
| 1 | 2 |

Second Embodiment

In this embodiment, the method selects ith line segments and concave vertices in sequential order around the boundary of the polygonal shape in the same manner as the first embodiment. The method also selects the jth line segments in similar manner. However in this embodiment, the method determines the perpendicular distance from the current ith line segment at an arbitrary point on the current ith line segment to a point of a locus between the current ith line segment and said selected jth line segment. In a similar manner to the first embodiment, the arbitrary point has a corresponding parameter value. The present embodiment then repeats this operation for each remaining said jth line segments of the polygon for the same arbitrary point. The method then determines the locus point which has the smallest said perpendicular distance at this arbitrary point. This locus point forms a point of the skeleton. The method may then select another arbitrary point on the current line segment. The method continues to the next ith line segment and performs the same operations again.

In this embodiment, the method also determines the distance from a current concave vertex along an aribitrary radial line to a point of a locus between the current concave vertex and the selected line segment. The method repeats this operation for the remaining line segments along said same radial line. The method then determines a locus point having the smallest distance from the current concave vertex. This locus point forms a point of the components of the skeleton. The method may then select another arbitrary radial line on the current line segment. The method then continues to the next ith concave vertex and performs the same operations again.

The first embodiment is preferred as it is more efficient and it is able to represent the skeleton in a more compact manner.

Preferred Embodiment of Apparatus(s)

Figure 23:
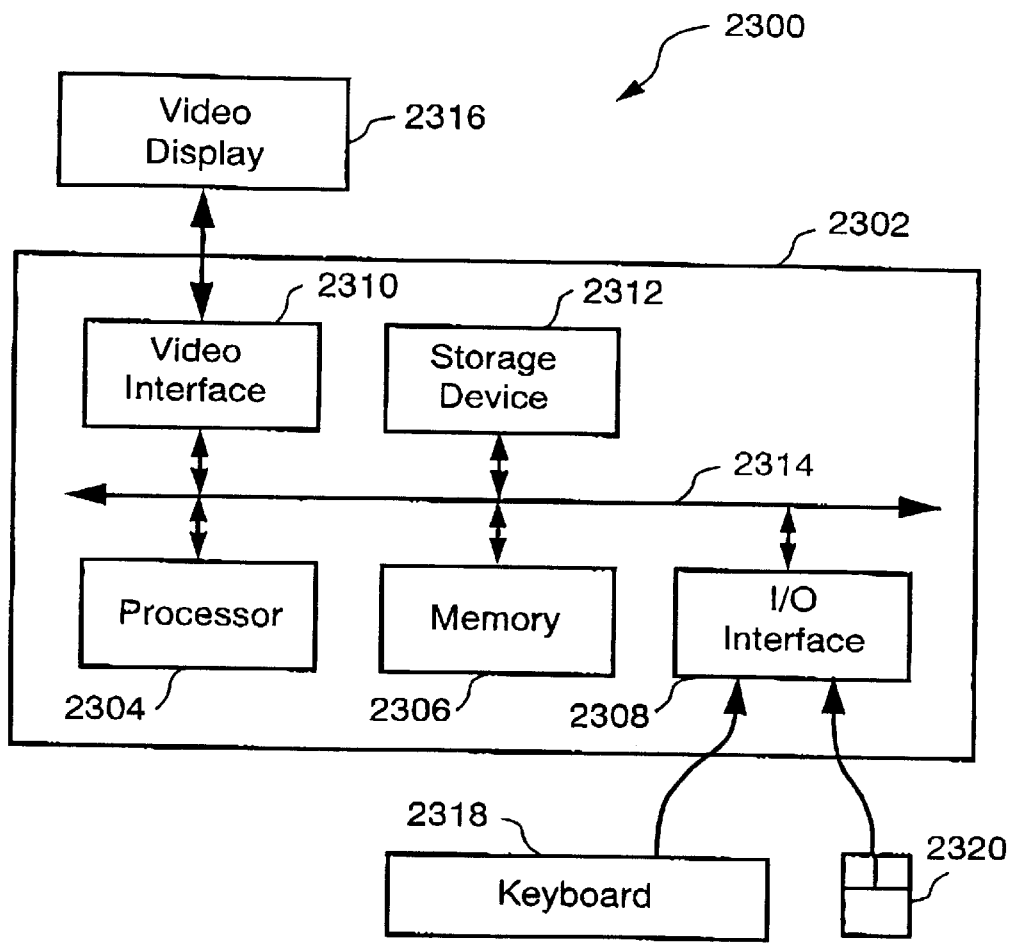
FIG. 23 is a block diagram of a general-purpose computer.

The preferred methods of generating a geometric skeleton of a polygonal shape is preferably practiced using a conventional general-purpose computer, such as the one shown in FIG. 23, wherein the first and second embodiments and/or the computer code shown in Appendix A way be implemented as software executing on the computer. In particular, the steps of method of generating a skeleton are effected by instructions in the software that are carried out by the computer. The software may be divided into two separate parts; one part for carrying out the generation methods; and another part to manage the user interface between the latter and the user. The software may be stored in a computer readable medium, including the storage devices described below, for subsequent transmission to the computer. The software may also be directly transmitted to the computer via wire or wireless. The software once transmitted can then be executed by the computer.

The computer system 2300 consists of the computer 2302, a video display 2316, and input devices 2318, 2320. In addition, the computer system 2300 can have any of a number of other output devices including line printers, laser printers, plotters, and other reproduction devices connected to the computer 2302. The computer system 2300 can be connected to one or more other computers via a communication interface using an appropriate communication channel such as a modem communications path, a computer network, or the like. The computer network may include a local area network (LAN), a wide area network (WAN), an Intranet, and/or the Internet The computer 2302 itself consists of a central processing unit(s) (simply referred to as a processor hereinafter) 2304, a memory 2306 which may include random access memory (RAM) and read-only memory (ROM), input/output (IO) interfaces 2308, a video interface 2310, and one or more storage devices generally represented by a block 2312 in FIG. 23. The storage device(s) 2312 can consist of one or more of the following: a floppy disc, a hard disc drive, a magneto-optical disc drive, CD-ROM, magnetic tape or any other of a number of non-volatile storage devices well known to those skilled in the art. Each of the components 2304 to 2312 is typically connected to one or more of the other devices via a bus 2314 that in turn can consist of data, address, and control buses.

The video interface 2310 is connected to the video display 2316 and provides video signals from the computer 2302 for display on the video display 2316. User input to operate the computer 2302 can be provided by one or more input devices 2308. For example, an operator can use the keyboard 2318 and/or a pointing device such as the mouse 2320 to provide input to the computer 2302.

The system 2300 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing are merely exemplary of the types of computers with which the embodiments of the invention may be practiced. Typically, the processes of the embodiments, described hereinafter, are resident as software or a program recorded on a hard disk drive (generally depicted as block 2312 in FIG. 23) as the computer readable medium, and read and controlled using the processor 2304. Intermediate storage of the program and pixel data and any data fetched from the network may be accomplished using the semiconductor memory 2306, possibly in concert with the hard disk drive 2312.

In some instances, the program may be supplied to the user encoded on a CD-ROM or a floppy disk (both generally depicted by block 2312), or alternatively could be read by the user from the network via a modem device connected to the computer, for example. Still further, the software can also be loaded into the computer system 2300 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

The method of generating the skeleton may alternatively be implemented in dedicated hardware such as one or more integrated circuits performing the functions or sub functions of generating the skeleton. Such dedicated hardware may include graphic processors, digital signal processors, or one or more microprocessors and associated memories.

The foregoing only describes a small number of embodiments of the present invention, however, modifications and/or changes can be made thereto art without departing from the scope and spirit of the invention. The present embodiments are, therefore, to be considered in all respects to be illustrative and not restrictive.

I claim:

1. A method of image processing to generate a component of a geometric skeleton of a polygon, the polygon comprising a plurality of interconnected line segments, the method comprising the step of:

determining, for a current line segment of said plurality, a first point on a line perpendicular to said current line segment at a second point corresponding to a parameter value, wherein said first point is a point of a locus between said current line segment and one other of said line segments, which locus point is the closest locus point, on said line, to the current line segment of any locus point of said current line segment and any one of the line segments other than the current line segment, said first point forming a point of said component of said skeleton.

2. A method as claimed in claim 1, further comprising repeating said determining step for a plurality of said second points corresponding to a plurality of different ones of parameter values to form a plurality of said first points.

3. A method as claimed in claim 2, further comprising:

repeating said determining step for each said line segment of said polygon to determine a corresponding said component, and combining said components to form said geometric skeleton.

4. A method as claimed in claim 1, wherein said determining step comprises, for each said line segment, the sub-steps of:

(a) selecting one of said line segments other than the current line segment;

(b) determining that parameter value, where the perpendicular distance from the current line segment to a point of a locus between the current line segment and the selected line segment is a minimum at a second point corresponding to said determined parameter value;

(c) determining that line segment, where the perpendicular distance from the current line segment to a point of a locus between said current line segment and the determined line segment at a second point corresponding to said determined parameter value is the minimum of the perpendicular distances from the current line segment to any locus point of said current line segment and any one of said line segments other than the current line segment at a second point corresponding to said determined parameter value, (d) storing said determined parameter value, and a label representative of said determined line segment, as a data signal representative of the components of said skeleton;

(e) repeating said steps (a) to (d) for each remaining said line segment.

5. A method as claimed in claim 4, wherein said determining step further comprises:

generating said points of said components of said skeleton using said stored parameter values and labels.

6. A method as claimed in claim 1, wherein said determining step performs the following sub-steps for each line segment:

(a) selecting a line segment other than the current line segment;

(b) determining the perpendicular distance from said current line segment at said second point to a point of a locus between the current line segment and said selected line segment;

(c) repeating substeps (a) and (b) for the remaining said line segments; and (d) determining a said locus point which has the smallest said perpendicular distance, wherein said determined point forms a point of said components of said skeleton.

7. A method as claimed in claim 6, wherein said method performs said determining step for a plurality of said second points corresponding to a plurality of parameter values.

8. A method of image processing to generate components of a geometric skeleton of a polygon, wherein said polygon comprises a plurality of line segments and one or more concave vertices, the method comprising the step of:

determining, for each said concave vertex, a first point on a radial line from the current concave vertex, wherein said radial line has a corresponding parameter value and said first point is a point of a locus between said current concave vertex and a said line segment, which locus point is the closest locus point on said radial line of any locus point of said current concave vertex and any one of said line segments, said first point forming a point of said components of said skeleton.

9. A method as claimed in claim 8, wherein said method performs said determining step for a plurality of radial lines having corresponding parameter values.

10. A method as claimed in claim 8, wherein said determining step performs the following sub-steps for each concave vertex:

(a) selecting a line segment;

(b) determining a said parameter value, wherein the distance from the current concave vertex to a point of a locus between the current concave vertex and the selected line segment is a minimum along the radial line corresponding to said determined parameter value;

(c) determining a said line segment, wherein the distance from the current concave vertex to a point of a locus between said current concave vertex and the determined line segment along the radial line corresponding to said determined parameter value is the minimum of the distances from the current concave vertices to any locus point of said current concave vertex and any one of said line segments along the radial line corresponding to said determined parameter value, (d) storing said determined parameter value, and a label representative of said determined line segment, as a data signal representative of the components of said skeleton; and (e) repeating said steps (a) to (d) for each remaining said line segment.

11. A method as claimed in claim 10, wherein said determining step further comprises:

generating said points of said components of said skeleton using said stored parameter values and labels.

12. A method as claimed in claim 8, wherein said determining step comprises the sub-steps:

(a) selecting a concave vertex of the polygon;

(b) determining the distance from said current concave vertex along a radial line to a point of a locus between the current concave vertex and said selected line segment;

(c) repeating substeps (a) and (b) for the remaining said line segments along said same radial line; and (d) determining a said locus point having the smallest said distance from the current concave vertex, wherein said determined point forms a point of said components of said skeleton.

13. A method as claimed in claim 12, wherein said method performs said determining step for a plurality of said radial lines corresponding to a plurality of parameter values.

14. A method of image processing to generate a geometric skeleton of a polygonal shape, the method comprising the steps of:

determining a parameter value of an edge or concave vertex of the polygonal shape where the distance from said edge or concave vertex to a point of a locus between said edge or concave vertex and another edge of the polygonal shape is a minimum; and storing said parameter value and a label representative of said another edge having said minimum distance as a data signal representative of the geometric skeleton at said parameter value.

15. A method of image processing to generate a representation of components of a geometric skeleton of a polygon, wherein the polygon comprises a plurality of line segments, the method comprising the steps of:

generating, for each said line segment (i) of the polygon, a list comprising a plurality of members { . . . , (t',N), . . . ,(t",P), . . . }, where (t',N) and (t",P) are any members of the list, t' and t" are parameter values of a current line segment (i) and which are adjacent parameter values in the list, and N and P are said line segments of the polygon other than the current line segment (i), whereby a point of locus (i,N) on a line perpendicular to the current line segment (i) at the parameter value t' forms one point of the skeleton and a point of locus(i,P) on a line perpendicular to the current line segment (i) at the parameter value t" forms another point of the skeleton, and for any parameter value t''' immediate t' and t" a point, being one of a point of locus (i,N) or a point of locus(i,P) on the line perpendicular to the current line segment (i) at the parameter value t''', which is closest to the current line segment (i) forms another point of the skeleton; and storing said lists as a representation of said components of said skeleton.

16. A method of image processing to generate a representation of components of a geometric skeleton of a polygon, wherein the polygon comprises a plurality of line segments and one or more concave vertices, the method comprising the steps of:

generating, for each concave vertex (i) of the polygon, a list comprising a plurality of members { . . . , (θ',N), . . . ,(θ",P), . . . }, where (θ',N) and (θ",P) are any members of the list, θ' and θ" are parameter values of a current concave vertex (i) and which are adjacent parameter values in the list, and N and P are said line segments of the polygon, whereby a point of locus(i,N) on a radial line from the current concave vertex (i) at the parameter value θ' forms one point of the skeleton and a point of locus(i,P) on a radial line from the current concave vertex (i) at the parameter value θ" forms another point of the skeleton, and for any parameter value θ''' immediate θ' and θ" a point, being one of a point of locus (i,N) or a point of locus(i,P) on the radial line from the current concave vertex (i) at the parameter value θ''', which is closest to the current concave vertex (i) forms another point of the skeleton; and storing said lists as a representation of said components of said skeleton.

17. A method of image processing to generate a representation of a geometric skeleton of a polygon, wherein the polygon comprises a plurality of line segments, the method comprising the steps of:

generating, for each said line segment (i) of the polygon, a list comprising a plurality of members { . . . , (t',N), . . . ,(t",P), . . . }, where (t',N) and (t",P) are any members of the list, t' and t" are parameter values of a current line segment (i) and which are adjacent parameter values in the list, and N and P are said line segments of the polygon other than the current line segment (i), whereby a point of locus(i,N) on a line perpendicular to the current line segment (i) at the parameter value t' forms one point of the skeleton and a point of locus(i,P) on a line perpendicular to the current line segment (i) at the parameter value t" forms another point of the skeleton, and for any parameter value t''' immediate t' and t" a point, being one of a point of locus (i,N) or a point of locus(i,P) on the line perpendicular to the current line segment (i) at the parameter value t''', which is closest to the current line segment (i) forms another point of the skeleton;

generating, for each concave vertex (i) of the polygon if any, a list comprising a plurality of members { . . . ,(θ',N), . . . ,(θ",P), . . . }, where (θ',N) and (θ",P) are any members of the list, θ' and θ" are parameter values of a current concave vertex (i) and which are adjacent parameter values in the list, and N and P are said line segments of the polygon, whereby a point of locus(i,N) on a radial line from the current concave vertex (i) at the parameter value θ' forms one point of the skeleton and a point of locus(i,P) on a radial line from the current concave vertex (i) at the parameter value θ" forms another point of the skeleton, and for any parameter value θ''' immediate θ' and θ" a point, being one of a point of locus (i,N) or a point of locus(i,P) on the radial line from the current concave vertex (i) at the parameter value θ''', which is closest to the current concave vertex (i) forms another point of the skeleton; and storing said lists as a representation of said skeleton.

18. A method of image processing to generate a representation of skeletal components of a polygon, the method comprising the steps of:

(a) selecting a first edge $N_i$ of the polygon;

(b) creating a list associated with said first edge for storing k members ($t_k$, $N_k$), where $t_k$ is a parameter value associated with a point on said first edge, and $N_k$ is an edge of the polygon;

(c) selecting a second edge $N_j$ of the polygon other than the first edge $N_i$;

(d) determining at least one said parameter value on said first edge $N_i$ so that a locus($N_i$,$N_j$) distance function is monotonic moving away from said at least one parameter value;

(e) adding said determined parameter value to said list if not already on said list;

(f) determining, for each two members of the list ($t_k$,$N_k$), ($t_{k+1}$, $N_{k+1}$) having adjacent parameter values, if a point of locus($N_i$,$N_j$) is closer to the first edge than either of a point of locus($N_i$,$N_k$) and a point of locus($N_i$,$N_{k+1}$) at any parameter value intermediate $t_k$ and $t_{k+1}$;

(g) adding said determined intermediate parameter value to said list, if not already on said list;

(h) replacing any existing member ($t_k$,$N_k$) of the list with the member ($t_k$,$N_j$) if the locus ($N_i$,$N_j$) distance function is less than the locus ($N_i$,$N_k$) distance function at the parameter value $t_k$;

(i) repeating steps (c) to (h) for each remaining said second edge;

(j) repeating steps (a) to (i) for each remaining said first edge; and (k) storing said lists as a data signal representative of said skeletal components.

19. A method as claimed in claim 18, wherein each said list is sorted in ascending order of parameter values.

20. A method of image processing to generate a representation of skeletal components of a polygon, the method comprising the steps of:

(a) selecting a first concave vertex $V_i$ of the polygon;

(b) creating a list associated with said first concave vertex for storing k members ($t_k$,$N_k$), where $t_k$ is a parameter value associated with a radial line from said first concave vertex, and $N_k$ is an edge of the polygon;

(c) selecting a second edge $N_j$ of the polygon;

(d) determining at least one said parameter value associated with said first concave vertex $V_i$ so that a locus ($V_i$,$N_j$) distance function is monotonic moving away from said at least one parameter value;

(e) adding said determined parameter value to said list if not already on said list;

(f) determining, for each two members of the list ($t_k$,$N_k$), ($t_{k+1}$, $N_{k+1}$) having adjacent parameter values, if a point of locus($V_i$,$N_j$) is closer to the first concave vertex than either of a point of locus($V_i$,$N_k$) and a point of locus ($V_i$,$N_{k+1}$) at any parameter value intermediate $t_k$ and $t_{k+1}$;

(g) adding said determined intermediate parameter value to said list, if not already on said list;

(h) replacing any existing member ($t_k$,$N_k$) of the list with the member ($t_k$,$N_j$) if the locus ($V_i$,$N_j$) distance function is less than the locus ($V_i$,$N_k$) distance function at the parameter value $t_k$;

(i) repeating steps (c) to (h) for each remaining said second edge;

(j) repeating steps (a) to (i) for each remaining said first concave vertices; and (k) storing said lists as a data signal representative of said skeletal components.

21. A method as claimed in claim 20, wherein each said list is sorted in ascending order of parameter values.

22. Apparatus for image processing to generate a component of a geometric skeleton of a polygon, said polygon comprising a plurality of interconnected line segments, the apparatus comprising:

means for determining, for a current line segment of said plurality of interconnected line segments, a first point on a line perpendicular to said current line segment at a second point corresponding to a parameter value, wherein said first point is a point of a locus between said current line segment and one other of said line segments, which locus point is the closest locus point, on said line, to the current line segment of any locus point of said current line segment and any one of the line segments other than the current line segment, said first point forming a point of said component of said skeleton.

23. Apparatus for image processing to generate components of a geometric skeleton of a polygon, wherein said polygon comprises a plurality of line segments and one or more concave vertices, the apparatus comprising:

means for determining, for each said concave vertex, a first point on a radial line from the current concave vertex, wherein said radial line has a corresponding parameter value and said first point is a point of a locus between said current concave vertex and a said line segment, which locus point is the closest locus point on said radial line of any locus point of said current concave vertex and any one of said line segments, said first point forming a point of said components of said skeleton.

24. Apparatus for image processing to generate a representation of components of a geometric skeleton of a polygon, wherein the polygon comprises a plurality of line segments, the apparatus comprising:

means for generating, for each said line segment (i) of the polygon, a list comprising a plurality of members { . . . ,(t',N), . . . ,(t",P), . . . }, where (t',N) and (t",P) are any members of the list, t' and t" are parameter values of a current line segment (i) and which are adjacent parameter values in the list, and N and P are said line segments of the polygon other than the current line segment (i), whereby a point of locus(i,N) on a line perpendicular to the current line segment (i) at the parameter value t' forms one point of the skeleton and a point of locus(i,P) on a line perpendicular to the current line segment (i) at the parameter value t" forms another point of the skeleton, and for any parameter value t''' immediate t' and t" a point, being one of a point of locus (i,N) or a point of locus(i,P) on the line perpendicular to the current line segment (i) at the parameter value t''', which is closest to the current line segment (i) forms another point of the skeleton; and means for storing said lists as a representation of said components of said skeleton.

25. Apparatus for image processing to generate a representation of components of a geometric skeleton of a polygon, wherein the polygon comprises a plurality of line segments and one or more concave vertices, the apparatus comprising:

means for generating, for each concave vertex (i) of the polygon, a list comprising a plurality of members { ...,(θ',N), ...,(θ",P), ... }, where (θ',N) and (θ",P) are any members of the list, θ' and θ" are parameter values of a current concave vertex (i) and which are adjacent parameter values in the list, and N and P are said line segments of the polygon, whereby a point of locus(i,N) on a radial line from the current concave vertex (i) at the parameter value θ' forms one point of the skeleton and a point of locus(i,P) on a radial line from the current concave vertex (i) at the parameter value θ" forms another point of the skeleton, and for any parameter value θ''' immediate θ' and θ" a point, being one of a point of locus (i,N) or a point of locus(i,P) on the radial line from the current concave vertex (i) at the parameter value θ''', which is closest to the current concave vertex (i) forms another point of the skeleton; and means for storing said lists as a representation of said components of said skeleton.

26. Apparatus for image processing to generate a representation of a geometric skeleton of a polygon, wherein the polygon comprises a plurality of line segments, the apparatus comprising:

means for generating, for each said line segment (i) of the polygon, a list comprising a plurality of members { ...,(t',N), ...,(t",P), ... }, where (t',N) and (t",P) are any members of the list, t' and t" are parameter values of a current line segment (i) and which are adjacent parameter values in the list, and N and P are said line segments of the polygon other than the current line segment (i), whereby a point of locus(i,N) on a line perpendicular to the current line segment (i) at the parameter value t' forms one point of the skeleton and a point of locus(i,P) on a line perpendicular to the current line segment (i) at the parameter value t" forms another point of the skeleton, and for any parameter value t''' immediate t' and t" a point, being one of a point of locus (i,N) or a point of locus(i,P) on the line perpendicular to the current line segment (i) at the parameter value t''', which is closest to the current line segment (i) forms another point of the skeleton;

means for generating, for each concave vertex (i) of the polygon if any, a list comprising a plurality of members { ...,(θ',N), ...,(θ",P), ... }, where (θ',N) and (θ",P) are any members of the list, θ' and θ" are parameter values of a current concave vertex (i) and which are adjacent parameter values in the list, and N and P are said line segments of the polygon, whereby a point of locus(i,N) on a radial line from the current concave vertex (i) at the parameter value θ' forms one point of the skeleton and a point of locus(i,P) on a radial line from the current concave vertex (i) at the parameter value θ" forms another point of the skeleton, and for any parameter value θ''' immediate θ' and θ" a point, being one of a point of locus (i,N) or a point of locus(i,P) on the radial line from the current concave vertex (i) at the parameter value θ''', which is closest to the current concave vertex (i) forms another point of the skeleton; and means for storing said lists as a representation of said skeleton.

27. Apparatus for image processing to generate a representation of skeletal components of a polygon, the apparatus comprising:

first selection means for selecting a first edge $N_i$ of the polygon;

creation means for creating a list associated with said first edge for storing k members $(t_k,N_k)$, where $t_k$ is a parameter value associated with a point on said first edge, and $N_k$ is an edge of the polygon;

second selection means for selecting a second edge $N_j$ of the polygon other than the first edge $N_i$;

first determination means for determining at least one said parameter value on said first edge $N_i$ so that a locus $(N_i,N_j)$ distance function is monotonic moving away from said at least one parameter value;

first addition means for adding said determined parameter value to said list if not already on said list;

second determination means for determining, for each two members of the list $(t_k,N_k)$, $(t_{k+1,\ Nk+1})$ having adjacent parameter values, if a point of locus$(N_i,N_j)$ is closer to the first edge than either of a point of locus $(N_i,N_k)$ and a point of locus$(N_i\ N_{k+1})$ at any parameter value intermediate $t_k$ and $t_{k+1}$;

second addition means for adding said determined intermediate parameter value to said list, if not already on said list;

replacement means for replacing any existing member $(t_k,N_k)$ of the list with the member $(t_k,N_j)$ if the locus $(N_i,N_j)$ distance function is less than the locus $(N_i,N_k)$ distance function at the parameter value $t_k$;

first repetition means for repeating the operations of the second selection means, first determining means, first addition means, second determination means, second addition means, and replacement means for each remaining said second edge;

second repetition means for repeating the operations of the first selection means, creation means, second selection means, first determination means, first addition means, second determination means, second addition means, replacement means, and first repetition means for each remaining said first edge; and storage means for storing said lists as a data signal representative of said skeletal components.

28. Apparatus for image processing to generate a representation of skeletal components of a polygon, the apparatus comprising:

first selection means for selecting a first concave vertex $V_i$ of the polygon;

creation means for creating a list associated with said first concave vertex for storing k members $(t_k,N_k)$, where $t_k$ is a parameter value associated with a radial line from said first concave vertex, and $N_k$ is an edge of the polygon;

second selection means for selecting a second edge $N_j$ of the polygon;

first determination means for determining at least one said parameter value associated with said first concave vertex $V_i$ so that a locus$(V_i,N_j)$ distance function is monotonic moving away from said at least one parameter value;

first addition means for adding said determined parameter value to said list if not already on said list;

second determination means for determining, for each two members of the list $(t_k,N_k)$, $(t_{k+1}, N_{k+1})$ having adjacent parameter values, if a point of locus$(V_i,N_j)$ is closer to the first concave vertex than either of a point of locus$(V_i,N_k)$ and a point of locus$(V_i,N_{k+1})$ at any parameter value intermediate $t_k$ and $t_{k+1}$;

second addition means for adding said determined intermediate parameter value to said list, if not already on said list;

replacement means for replacing any existing member $(t_k,N_k)$ of the list with the member $(t_k,N_j)$ if the locus $(V_i,N_j)$ distance function is less than the locus $(V_i,N_k)$ distance function at the parameter value $t_k$;

first repetition means for repeating the operations of the second selection means, first determining means, first addition means, second determination means, second addition means, and replacement means for each remaining said second edge;

second repetition means for repeating the operations of the first selection means, creation means, second selection means, first determination means, first addition means, second determination means, second addition means, replacement means, and first repetition means for each remaining said first concave vertices; and storage means for storing said lists as a data signal representative of said skeletal components.

29. A computer program product having a computer readable medium comprising a computer program for image processing to generate a component of a geometric skeleton of a polygon, said polygon comprising a plurality of interconnected line segments, the computer program product comprising:

means for determining, for a current line segment of said plurality of interconnected line segments, a first point on a line perpendicular to said current line segment at a second point corresponding to a parameter value, wherein said first point is a point of a locus between said current line segment and one other of said line segments, which locus point is the closest locus point, on said line, to the current line segment of any locus point of said current line segment and any one of the line segments other than the current line segment, said first point forming a point of said component of said skeleton.

30. A computer program product having a computer readable medium comprising a computer program for image processing to generate components of a geometric skeleton of a polygon, wherein said polygon comprises a plurality of line segments and one or more concave vertices, the computer program product comprising:

means for determining, for each said concave vertex, a first point on a radial line from the current concave vertex, wherein said radial line has a corresponding parameter value and said first point is a point of a locus between said current concave vertex and a said line segment, which locus point is the closest locus point on said radial line of any locus point of said current concave vertex and any one of said line segments, said first point forming a point of said components of said skeleton.

31. A computer program product having a computer readable medium comprising a computer program for image processing to generate a representation of components of a geometric skeleton of a polygon, wherein the polygon comprises a plurality of line segments, the computer program product comprising:

means for generating, for each said line segment (i) of the polygon, a list comprising a plurality of members $\{ \ldots ,(t',N), \ldots ,(t'',P), \ldots \}$, where $(t',N)$ and $(t'',P)$ are any members of the list, $t'$ and $t''$ are parameter values of a current line segment (i) and which are adjacent parameter values in the list, and N and P are said line segments of the polygon other than the current line segment (i), whereby a point of locus(i,N) on a line perpendicular to the current line segment (i) at the parameter value $t'$ forms one point of the skeleton and a point of locus(i,P) on a line perpendicular to the current line segment (i) at the parameter value $t''$ forms another point of the skeleton, and for any parameter value $t'''$ immediate $t'$ and $t''$ a point, being one of a point of locus (i,N) or a point of locus(i,P) on the line perpendicular to the current line segment (i) at the parameter value $t'''$, which is closest to the current line segment (i) forms another point of the skeleton; and means for storing said lists as a representation of said components of said skeleton.

32. A computer program product having a computer readable medium comprising a computer program for image processing to generate a representation of components of a geometric skeleton of a polygon, wherein the polygon comprises a plurality of line segments and one or more concave vertices, the computer program product comprising:

means for generating, for each concave vertex (i) of the polygon, a list comprising a plurality of members $\{ \ldots ,(\theta',N), \ldots ,(\theta'',P), \ldots \}$, where $(\theta',N)$ and $(\theta'',P)$ are any members of the list, $\theta'$ and $\theta''$ are parameter values of a current concave vertex (i) and which are adjacent parameter values in the list, and N and P are said line segments of the polygon, whereby a point of locus(i,N) on a radial line from the current concave vertex (i) at the parameter value $\theta'$ forms one point of the skeleton and a point of locus(i,P) on a radial line from the current concave vertex (i) at the parameter value $\theta''$ forms another point of the skeleton, and for any parameter value $\theta'''$ immediate $\theta'$ and $\theta''$ a point, being one of a point of locus (i,N) or a point of locus(i,P) on the radial line from the current concave vertex (i) at the parameter value $\theta'''$, which is closest to the current concave vertex (i) forms another point of the skeleton; and means for storing said lists as a representation of said components of said skeleton.

33. A computer program product having a computer readable medium comprising a computer program for image processing to generate a representation of a geometric skeleton of a polygon, wherein the polygon comprises a plurality of line segments, the computer program product comprising:

means for generating, for each said line segment (i) of the polygon, a list comprising a plurality of members $\{ \ldots ,(t',N), \ldots ,(t'',P), \ldots \}$, where $(t',N)$ and $(t'',P)$ are any members of the list, $t'$ and $t''$ are parameter values of a current line segment (i) and which are adjacent parameter values in the list, and N and P are said line segments of the polygon other than the current line segment (i), whereby a point of locus(i,N) on a line perpendicular to the current line segment (i) at the parameter value $t'$ forms one point of the skeleton and a point of locus(i,P) on a line perpendicular to the current line segment (i) at the parameter value $t''$ forms another point of the skeleton, and for any parameter value $t'''$ immediate $t'$ and $t''$ a point, being one of a point of locus (i,N) or a point of locus(i,P) on the line perpendicular to the current line segment (i) at the parameter value t''', which is closest to the current line segment (i) forms another point of the skeleton;

means for generating, for each concave vertex (i) of the polygon if any, a list comprising a plurality of members { ...,(θ',N), ...,(θ'',P), ... }, where (θ',N) and (θ'',P) are any members of the list, θ' and θ'' are parameter values of a current concave vertex (i) and which are adjacent parameter values in the list, and N and P are said line segments of the polygon, whereby a point of locus(i,N) on a radial line from the current concave vertex (i) at the parameter value θ' forms one point of the skeleton and a point of locus(i,P) on a radial line from the current concave vertex (i) at the parameter value θ'' forms another point of the skeleton, and for any parameter value θ''' immediate θ' and θ'' a point, being one of a point of locus (i,N) or a point of locus(i,P) on the radial line from the current concave vertex (i) at the parameter value θ''', which is closest to the current concave vertex (i) forms another point of the skeleton; and means for storing said lists as a representation of said skeleton.

34. A computer program product having a computer readable medium comprising a computer program for image processing to generate a representation of skeletal components of a polygon, the computer program product comprising:

first selection means for selecting a first edge $N_i$ of the polygon;

creation means for creating a list associated with said first edge for storing k members $(t_k, N_k)$, where $t_k$ is a parameter value associated with a point on said first edge, and $N_k$ is an edge of the polygon;

second selection means for selecting a second edge $N_j$ of the polygon other than the first edge $N_i$;

first determination means for determining at least one said parameter value on said first edge $N_i$ so that a locus $(N_i, N_j)$ distance function is monotonic moving away from said at least one parameter value;

first addition means for adding said determined parameter value to said list if not already on said list;

second determination means for determining, for each two members of the list $(t_k, N_k)$, $(t_{k+1}, N_{k+1})$ having adjacent parameter values, if a point of locus$(N_i, N_j)$ is closer to the first edge than either of a point of locus $(N_i, N_k)$ and a point of locus$(N_i, N_{k+1})$ at any parameter value intermediate $t_k$ and $t_{k+1}$;

second addition means for adding said determined intermediate parameter value to said list, if not already on said list;

replacement means for replacing any existing member $(t_k, N_k)$ of the list with the member $(t_k, N_j)$ if the locus $(N_i, N_j)$ distance function is less than the locus $(N_i, N_k)$ distance function at the parameter value $t_k$;

first repetition means for repeating the operations of the second selection means, first determining means, first addition means, second determination means, second addition means, and replacement means for each remaining said second edge;

second repetition means for repeating the operations of the first selection means, creation means, second selection means, first determination means, first addition means, second determination means, second addition means, replacement means, and first repetition means for each remaining said first edge; and storage means for storing said lists as a data signal representative of said skeletal components.

35. A computer program product having a computer readable medium comprising a computer program for image processing to generate a representation of skeletal components of a polygon, the computer program product comprising:

first selection means for selecting a first concave vertex $V_i$ of the polygon;

creation means for creating a list associated with said first concave vertex for storing k members $(t_k, N_k)$, where $t_k$ is a parameter value associated with a radial line from said first concave vertex, and $N_k$ is an edge of the polygon;

second selection means for selecting a second edge $N_j$ of the polygon;

first determination means for determining at least one said parameter value associated with said first concave vertex $V_i$ so that a locus$(V_i, N_j)$ distance function is monotonic moving away from said at least one parameter value;

first addition means for adding said determined parameter value to said list if not already on said list;

second determination means for determining, for each two members of the list $(t_k, N_k)$, $(t_{k+1}, N_{k+1})$ having adjacent parameter values, if a point of locus$(V_i, N_j)$ is closer to the first concave vertex than either of a point of locus$(V_i, N_k)$ and a point of locus$(V_i, N_{k+1})$ at any parameter value intermediate $t_k$ and $t_{k+1}$;

second addition means for adding said determined intermediate parameter value to said list, if not already on said list;

replacement means for replacing any existing member $(t_k, N_k)$ of the list with the member $(t_k, N_j)$ if the locus $(V_i, N_j)$ distance function is less than the locus $(V_i, N_k)$ distance function at the parameter value $t_k$;

first repetition means for repeating the operations of the second selection means, first determining means, first addition means, second determination means, second addition means, and replacement means for each remaining said second edge;

second repetition means for repeating the operations of the first selection means, creation means, second selection means, first determination means, first addition means, second determination means, second addition means, replacement means, and first repetition means for each remaining said first concave vertices; and storage means for storing said lists as a data signal representative of said skeletal components.

* * * * *

UNITED STATES PATENT AND TRADEMARK OFFICE
CERTIFICATE OF CORRECTION

PATENT NO. : 6,654,015 B1
DATED : November 25, 2003
INVENTOR(S) : Michael Richard Arnold It is certified that error appears in the above-identified patent and that said Letters Patent is hereby corrected as shown below:

Column 13,
Line 30, "FIGS. 6,8A," should read -- FIGS. 6, 8A --.

Column 14,
Line 45, "values" should read -- values. --.

Column 15,
Line 57, "value" should read -- value(s) --.

Column 17,
Line 42, "lessor" should read -- lesser --.

Column 18,
Line 43, "seen" should read -- seen, --; and
Lines 55, 57 and 67, "$\theta_{min}, \theta_{x2}$" should read -- $\theta_{min}$, $\theta_{x2}$ --.

Column 19,
Line 19, "necessary" should read -- necessarily --;
Line 22, "only" should read -- only. --; and
Lines 50, 52, 54, 56, 59 and 60, "<=d" (both occurrences) should read -- $\leqq d$ --.

Column 20,
Lines 1, 2 and 3, "<=min" should read -- $\leqq$min --; and
Line 59, "a" should read -- an --.

Column 21,
Line 6, "complewtion" should read -- completion --; and
Line 46, "there" should read -- there are --.

Column 23,
Line 17, "lessor" should read -- lesser --.

UNITED STATES PATENT AND TRADEMARK OFFICE
CERTIFICATE OF CORRECTION

PATENT NO. : 6,654,015 B1
DATED : November 25, 2003
INVENTOR(S) : Michael Richard Arnold It is certified that error appears in the above-identified patent and that said Letters Patent is hereby corrected as shown below:

Column 27,
Line 33, "thereto art" should read -- thereto --.

Signed and Sealed this

Seventh Day of February, 2006

JON W. DUDAS
*Director of the United States Patent and Trademark Office*